(12) United States Patent
Knapp

(10) Patent No.: US 10,343,572 B2
(45) Date of Patent: Jul. 9, 2019

(54) ADJUSTABLE HEAD AND NECK SYSTEM

(71) Applicant: Travis Lyn Knapp, Austin, TX (US)

(72) Inventor: Travis Lyn Knapp, Austin, TX (US)

(*) Notice: Subject to any disclaimer, the term of this patent is extended or adjusted under 35 U.S.C. 154(b) by 0 days.

(21) Appl. No.: 15/588,491

(22) Filed: May 5, 2017

(65) Prior Publication Data

US 2017/0320413 A1 Nov. 9, 2017

Related U.S. Application Data

(60) Provisional application No. 62/332,340, filed on May 5, 2016.

(51) Int. Cl.
| | |
|---|---|
| *A47C 7/36* | (2006.01) |
| *A47C 7/38* | (2006.01) |
| *B60N 2/80* | (2018.01) |
| *A41D 1/00* | (2018.01) |
| *B60N 2/882* | (2018.01) |
| *B60N 2/809* | (2018.01) |

(52) U.S. Cl.
CPC ............. *B60N 2/882* (2018.02); *A47C 7/383* (2013.01); *A41D 1/00* (2013.01); *B60N 2/80* (2018.02); *B60N 2/809* (2018.02)

(58) Field of Classification Search
CPC .......... A47C 7/383; B60N 2/882; B60N 2/80; B60N 2/809; B60N 2/663; A41D 1/00
USPC .......... 248/118, 279.1; 5/652, 657; 297/399, 297/488, 216.12, 220, 393; 280/751; 602/17, 18, 19
See application file for complete search history.

(56) References Cited

U.S. PATENT DOCUMENTS

| | | | |
|---|---|---|---|
| 3,062,586 A | 11/1962 | Rowland | |
| 3,101,973 A | 8/1963 | Toth | |
| 3,669,102 A * | 6/1972 | Harris | A61F 5/055 602/40 |
| 3,873,996 A * | 4/1975 | Varteressian | A42B 3/0473 2/421 |
| 4,589,407 A * | 5/1986 | Koledin | A61F 5/05883 128/869 |
| 4,593,788 A * | 6/1986 | Miller | A61F 5/05883 128/869 |
| 4,679,263 A | 7/1987 | Honer | |
| 5,121,969 A | 6/1992 | Schroeder | |
| 5,201,702 A * | 4/1993 | Mars | A61F 5/055 602/17 |
| 5,251,957 A | 10/1993 | Lemens | |
| 5,314,404 A * | 5/1994 | Boughner | A61F 5/055 128/876 |
| 5,707,108 A | 1/1998 | Pi | |
| 6,461,256 B1 * | 10/2002 | Popeck | A63B 69/0059 473/450 |
| 6,641,220 B2 | 11/2003 | Clegg | |
| 7,004,545 B2 | 2/2006 | Miller | |
| 7,059,678 B1 | 6/2006 | Taylor | |
| 8,814,266 B2 * | 8/2014 | Guering | B64D 11/06 297/216.12 |
| 9,283,878 B2 * | 3/2016 | Zaouk | B60R 22/00 |

(Continued)

*Primary Examiner* — Tan Le
(74) *Attorney, Agent, or Firm* — Reed & Scardino LLP; Ross D. Snyder

(57) ABSTRACT

In accordance with at least one embodiment, an adjustable head and neck system comprises a locking upright brace and a forehead support. The forehead support is coupled to the locking upright brace. The forehead support is configurable to support a user's forehead.

20 Claims, 23 Drawing Sheets

(56) References Cited

U.S. PATENT DOCUMENTS

| | | |
|---|---|---|
| 9,833,025 B2 | 12/2017 | Knapp |
| 2015/0352988 A1* | 12/2015 | Knapp ................... B60N 2/882 297/393 |

* cited by examiner

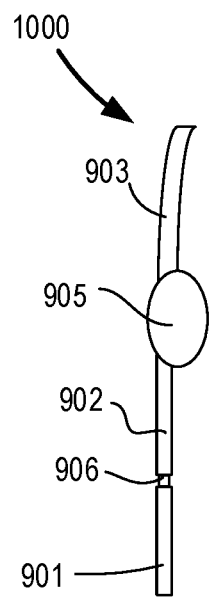 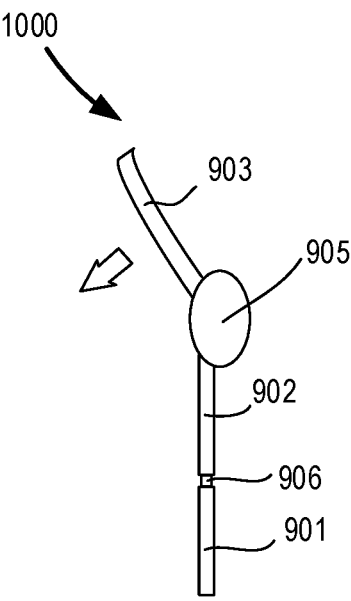 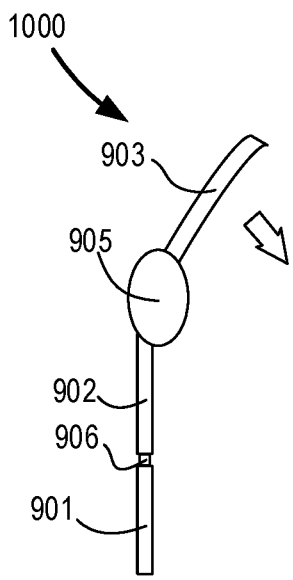
FIG. 16  FIG. 17  FIG. 18
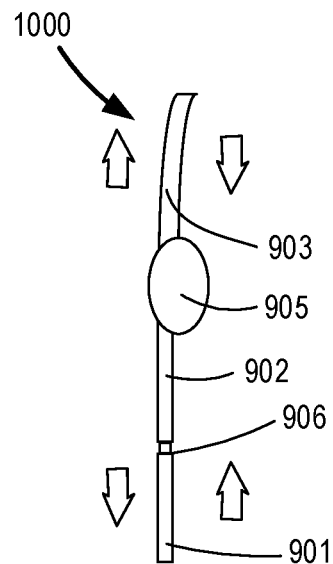
FIG. 19

ADJUSTABLE HEAD AND NECK SYSTEM

CROSS-REFERENCE TO RELATED APPLICATION(S)

The present application claims the benefit of provisional U.S. Patent Application No. 62/332,340, entitled "ADJUSTABLE HEAD AND NECK SYSTEM" filed on May 5, 2016, the entirety of which is herein incorporated by reference.

BACKGROUND

Field of the Disclosure

The present disclosure relates generally to an anatomical brace apparatus and system and more particularly to an anatomical brace apparatus and system adapted to be used in relation to at least one of a wearer's head and the wearer's neck.

Background of the Disclosure

Long-distance travelers are familiar with the difficulties associated with trying to rest while seated. It is not uncommon for travelers on airplanes to fall asleep in their seats only to awake to an uncomfortable neck from the inability of the body to maintain an ergonomic head position against the influence of gravity while in a seated position.

Various simple pillow-like devices have been tried to provide some support, chiefly on the sides and to the back, but they appear to offer no benefit when a traveler's head bobs forward.

BRIEF DESCRIPTION OF THE DRAWINGS

The present disclosure may be better understood, and its numerous features and advantages made apparent to those skilled in the art by referencing the accompanying drawings.

FIG. 16 is a right elevation view of an adjustable head and neck system in accordance with at least one embodiment.

FIG. 17 is a right elevation view of the adjustable head and neck system of FIG. 16 configured to be folded in a rearward direction in accordance with at least one embodiment.

FIG. 18 is a right elevation view of the adjustable head and neck system of FIG. 16 configured to be folded in a forward direction in accordance with at least one embodiment.

FIG. 19 is a right elevation view of the adjustable head and neck system of FIG. 16 configured to extended and retracted in a vertical direction in accordance with at least one embodiment.

The use of the same reference symbols in different drawings indicates similar or identical items.

DETAILED DESCRIPTION OF THE DRAWINGS

Figure 1:
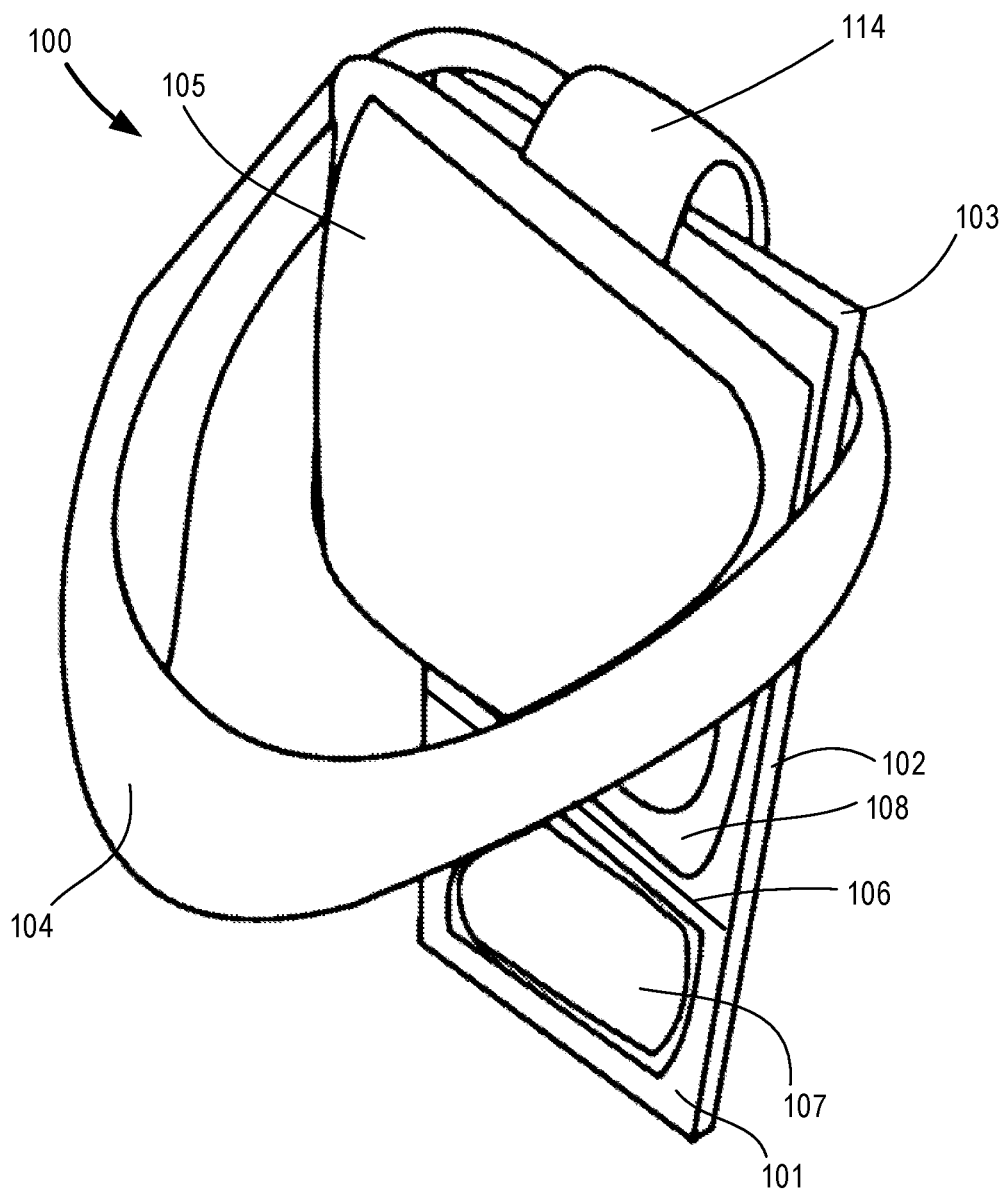
FIG. 1 is a perspective view of an adjustable head and neck system in accordance with at least one embodiment.

An adjustable head and neck system is provided. The adjustable head and neck system provides an ability to support a person's forehead, which can prevent it from bobbing forward. The adjustable head and neck system can be configured to use the pressure of the person leaning against the seat back to enhance stability of the adjustable head and neck system. The adjustable head and neck system can be configured to allow rapid and simple reconfiguration between a storage configuration in compact form and a deployed configuration ready for use.

In accordance with at least one embodiment, an adjustable head and neck system comprises a locking upright brace, a neck support, and a forehead support. An anchor pad may be connected to the locking upright brace. Back pad pressure anchors the brace to maintain its upward orientation. The back pad pressure can be provided by a user's back pressing against the anchor pad. The adjustable head and neck system can be used, for example, as an upright sleeping brace system.

In accordance with at least one embodiment, the forehead support comprises a headband that does not cover the user's eyes. In accordance with at least one embodiment, the forehead support comprises an eye mask that does cover the user's eyes. In accordance with at least one embodiment, the forehead support comprises a headwear item traditionally incapable of providing forehead support. Examples of such headwear items include a hat, a cap, a helmet, and a scarf. In accordance with at least one embodiment, the forehead support comprises video display eyewear. Examples of the video display eyewear include video display goggles, such as virtual reality (VR) or augmented reality (AR) goggles, and video display glasses.

In accordance with at least one embodiment, the locking upright brace can be molded, for example, of a polymer material or, as another example, of a fiber reinforced polymer material. In accordance with at least one embodiment, the locking upright brace can comprise multiple materials. As one example, the locking upright brace can comprise fiberglass components, such as rods, and metal couplers, such as sleeves, which can selectively couple the fiberglass components. As an example, the fiberglass components may define a cavity, such as an axial hole. An elastic material, such as shock cord, may be disposed within the cavity. The elastic material may extend from one brace component to another brace component. The elastic material can be configured to aid alignment of a component with a coupler. The elastic material can be configured to aid in retaining the components and coupler in an engaged configuration through the influence of tension applied by the elastic material. In accordance with at least one embodiment, the locking upright brace is configured to be foldable. The locking upright brace may be foldable in multiple directions. In accordance with at least one embodiment, the locking upright brace may be adjustable in a variety of ways. In accordance with at least one embodiment, the locking upright brace may be lockable in a variety of ways. In accordance with at least one embodiment, the locking upright brace may be provided in a variety of different sizes.

In accordance with at least one embodiment, the adjustable head and neck system comprises a pillow. The pillow may serve, for example, as a neck support. The pillow may, for example, be made of a soft, conformal material, for example, a polymer foam material, such as a memory foam material. The pillow may, for example, comprise an inflatable bladder, allowing, for example, the pillow to be inflated for use and deflated for storage.

In accordance with at least one embodiment, the adjustable head and neck system is compatible with users of various anatomical dimensions. As an example, a single adjustable head and neck system can be used by persons ranging from a small child, to a youth, to an adult. As an adjustable head and neck system need not extend an entire length of a user's spine, an embodiment of an adjustable head and neck system that extends substantially an entire length of a small child's spine may be used by larger users with larger spines such that the adjustable head and neck system extends over a lesser proportion of the user's spine as the size of the user is increased. As another example, an adjustable head and neck system may be provided in a variety of sizes to accommodate different users' anatomical dimensions and preferences.

In accordance with at least one embodiment, an adjustable head and neck system connects a hat to the upright brace and pad holding the head from going forward or backwards. Such a configuration is compatible, for example, even with very tall people.

In accordance with at least one embodiment, the adjustable head and neck system stacks and aligns the spine of the user. In accordance with at least one embodiment, the adjustable head and neck system is provided with massage spots, which may, for example, be molded massage spots or flat massage spots. The massage spots can engage the body of the user to provide comforting pressure against the user's body.

In accordance with at least one embodiment, the adjustable head and neck system folds from its deployed configuration to a compact form in its stored configuration. In accordance with at least one embodiment, the adjustable head and neck system provides a pocket in which one or more items, such as ear plugs, may be stored. In accordance with at least one embodiment, the adjustable head and neck system can be deployed from a stored configuration by telescoping. In accordance with at least one embodiment, the adjustable head and neck system can be deployed from a stored configuration by unfolding. In accordance with at least one embodiment, the adjustable head and neck system can be deployed from a stored configuration by both telescoping and unfolding. In accordance with at least one embodiment, the adjustable head and neck system is convertible between configurations in two or more ways. In accordance with at least on embodiment, the adjustable head and neck system can be folded from a single planar form to a tri-planar form, which can be referred to as a three-fold form. In accordance with at least on embodiment, the adjustable head and neck system can be folded from a single planar form to a quadra-planar form, which can be referred to as a four-fold form. In accordance with at least on embodiment, the adjustable head and neck system can be folded from a single planar form to a penta-planar form, which can be referred to as a five-fold form. In accordance with at least one embodiment, the adjustable head and neck system closes with a zipper. In accordance with at least one embodiment, the adjustable head and neck system closes with a hook and loop fastener, such as VELCRO. In accordance with at least one embodiment, the adjustable head and neck system closes with an elastic element. In accordance with at least one embodiment, the adjustable head and neck system closes with a snap element.

In accordance with at least one embodiment, an adjustable head and neck system engages a user's body at a forehead via a forehead support, at a neck via a neck support, and at a waist via an anchor pad strap. The anchor pad strap, which is a lower strap than any other strap, such as a headband in the form of a forehead strap, can be locked around a body of a user at a thoracto-abdominal location, such as at a thorax or an abdomen, for example, at a waist, of the user. In accordance with at least one embodiment, the anchor pad support can be used to provide head support which standing, for example. In accordance with at least one embodiment, the adjustable head and neck system can be incorporated into a garment, such as a jacket. When incorporated into a jacket, an anchor pad support of the adjustable head and neck system can provide support when the jacket is closed.

As an example, an adjustable head and neck system can be incorporated into a garment by sewing the adjustable head and neck system into clothing. Examples of garments into which at least one embodiment of an adjustable head and neck system can be sewn are jackets, coats, vests, hoodies, and hats. An adjustable head and neck system can be sewn into devices such as seats and support devices. When sewn into a garment or a device, an adjustable head and neck system can be folded or collapsed to allow storage of the adjustable head and neck system in a stored configuration. An adjustable head and neck system can be attached to a garment or device by sewing directly to the garment or device or by using a removable fastener, for example, hook and loop tape, such as VELCRO.

As applied to seats and support devices, a variety of types of seats can be provided with features to utilize an adjustable head and neck system. For example, baby seats, vehicle seats, airplane seats, vessel seats, railroad, subway, or light rail seats, transportation terminal seats, and the like can be temporarily or permanently modified or constructed to interface with at least one embodiment of the adjustable head and neck system. As an example, an adjustable head and neck system could be attached to a station (airline) seat by sewing a strip of long soft loop fastener of a hook and loop fastener system, such as VELCRO, on the back of the seat and applying hard hook fastener to the back of a brace panel of an adjustable head and neck system. Vertical adjustment of the adjustable head and neck system would be enabled by such a mounting system, and the adjustable head and neck system would remain in position until separation of the hook and loop fastener system were performed.

In accordance with at least one embodiment, an adjustable head and neck system comprising a lower strap, such as an adjustable waist band, can hold the user's head upright while the user is sitting or standing. By incorporating an upright brace and an anchor pad into clothing, an adjustable head and neck system can be adjusted and can provide neck support for a user. Adjustments can include, for example, folding and telescoping of the upright brace. In the case of an adjustable head and neck system comprising an adjustable waist band, the adjustable waist band can be adjusted to the waist of the user.

In accordance with at least one embodiment, a hooded garment incorporating an adjustable head and neck system can coordinate deployment and adjustment of the adjustable head and neck system with the operation of the hood of the garment. For example, the hood can fold up and lock the brace. In accordance with at least one embodiment, an anchor pad of an adjustable head and neck system can be sewn into a clothing back of the clothing item. The anchor pad is connected to the brace, which is connected to a forehead support to support the user's forehead. A neck support can be provided to support the user's neck. An adjustable waist band can be provided and can be incorporated into the clothing item, for example, by sewing the adjustable waist band into the clothing item.

In accordance with at least one embodiment, an adjustable head and neck system can provide a utility function and, in doing so, may be folded, rolled, or telescoped. For example, a hat or hood can be provided with an adjustable head and neck system that folds when not in use, allowing the clothing item to look normal but still be able to provide the utility function of the adjustable head and neck system. In accordance with at least one embodiment, an adjustable head and neck system can be molded. In accordance with at least one embodiment, the upright brace of an adjustable head and neck system can be of many forms. The upright brace can be moved from place to place. As an example, the upright brace can be configurable to move from a deployed position that allows engagement of the forehead support to the forehead of the user to a stored position in which the upright brace is no longer extended behind the user's head. As an example, the upright brace can be unlocked and rotated downward, away from a deployed position behind the head of the user. As another example, the upright brace can be unlocked and slid downward, away from the deployed position. In accordance with at least one example, the adjustable head and neck system uses the weight or pressure of the adjustable head and neck system itself, of an anatomical feature of the user, or of both to align and maintain the upright brace with a skeletal support feature of the user, such as the user's spine, with a support feature of furniture the user is using, such as a chair back, or with both. The weight or pressure of a sitting person leaning back can provide anchoring for an adjustable head and neck system. In accordance with at least one embodiment, an adjustable head and neck system can hold the head of the user with a hood, a strap, a hat, an eye mask, a band, a wig, or another material around the forehead of the user. In accordance with at least one embodiment, an adjustable head and neck system has a supportive pillow of foam for the neck, back, and head of the user.

FIG. 1 is a perspective view of an adjustable head and neck system in accordance with at least one embodiment. Adjustable head and neck system 100 comprises anchor pad 101, lower brace panel 102, upper brace panel 103, forehead support 104, pillow 105, flexible junction 106, anchor pad cushion 107, lower brace panel cushion 108, and forehead support retention strap 114. Anchor pad cushion is mounted on a front face of anchor pad 101. An upper edge of anchor pad 101 is connected to a lower edge of lower brace panel 102 via flexible junction 106. Flexible junction 106 can be constructed of a flexible element, or flexible junction 106 can be realized by the flexibility of material of anchor pad 101 and lower brace panel 102, which may be continuous between those elements. Rigidity of brace stays that may be present in lower brace panel, but not at flexible junction 106 can guide flexure to occur at flexible junction 106 even if the flexibility of the material extends down through anchor pad 101.

Lower brace panel cushion 108 is mounted on a front face of lower brace panel 102. A junction exists between lower brace panel 102 and upper brace panel 103, and, while it is obscured in FIG. 1, it is evident in subsequent view with respect to which its details will be described below. Pillow 105, which may serve, for example, as a neck support, as a head support, or as both, is mounted on upper brace panel 103. Forehead support retention strap 114 is connected to upper brace panel 103 and extends over the top of upper brace panel 103 to pass behind and retain forehead support 104 before being attached to the back surface of upper brace panel 103.

Figure 2:
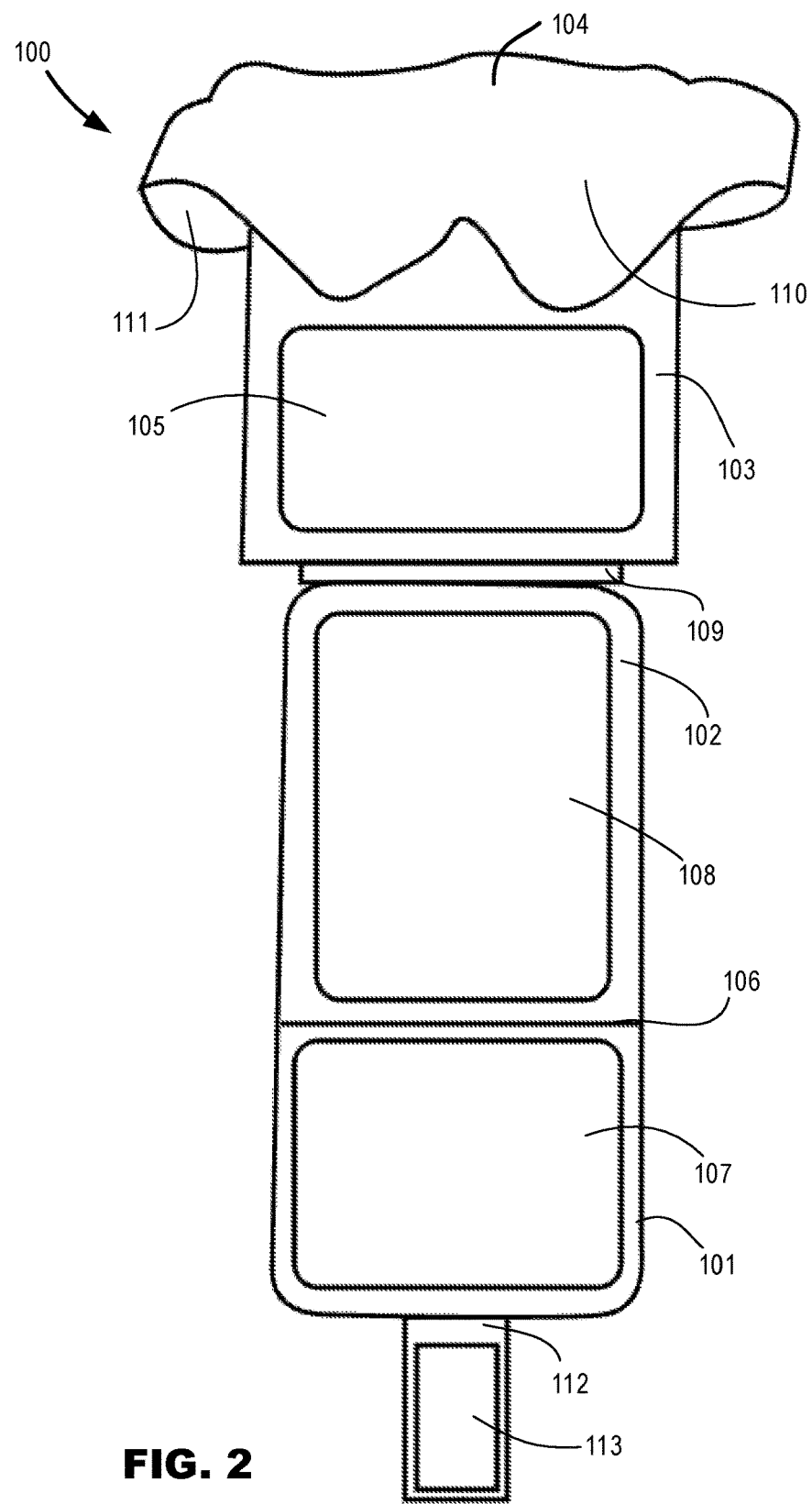
FIG. 2 is a front elevation view of the adjustable head and neck system in accordance with the embodiment shown in FIG. 1.

FIG. 2 is a front elevation view of the adjustable head and neck system in accordance with the embodiment shown in FIG. 1. Adjustable head and neck system 100 further comprises brace panel junction 109, which joins lower brace panel 102 and upper brace panel 103, as well as closure tab 112 and closure tab fastener 113. Closure tab fastener 113 is mounted on closure tab 112, which is attached to and extends from the lower edge of anchor pad 101. Brace panel junction 109 can be constructed to allow a separable connection between upper brace panel 103 and lower brace panel 102, as will be discussed in further detail below, for example, with respect to FIGS. 26 and 27. The forehead support 104 of FIG. 2 comprises an eye mask 110 and an eye mask strap 111. Eye mask 110 can be omitted, if desired, as shown in FIG. 1.

Figure 3:
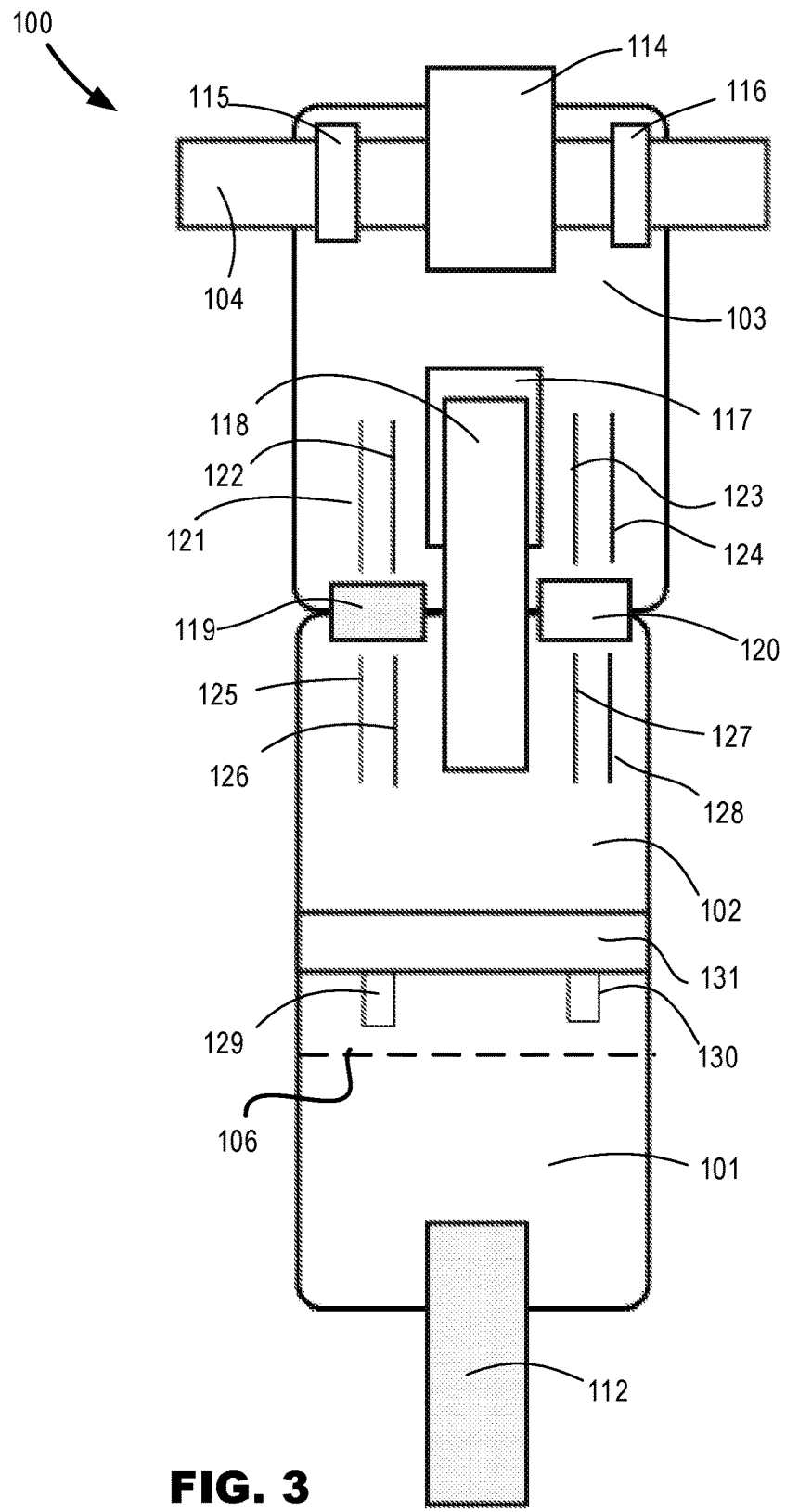
FIG. 3 is a rear elevation view of the adjustable head and neck system in accordance with the embodiment shown in FIG. 1.

FIG. 3 is a rear elevation view of the adjustable head and neck system in accordance with the embodiment shown in FIG. 1. Adjustable head and neck system 100 further comprises forehead support retention loop 115, forehead support retention loop 116, brace locking strap fastener pad 117, brace locking strap 118, brace hinge strap 119, brace hinge strap 120, brace retention stitching 121, brace retention stitching 122, brace retention stitching 123, brace retention stitching 124, brace retention stitching 125, brace retention stitching 126, brace retention stitching 127, brace retention stitching 128, brace retention stitching 129, brace retention stitching 130, and elastic strap 131. Forehead support retention loop 115 is positioned in a vertical orientation and attached to an upper left corner of the back surface of upper brace panel 103. Forehead support retention loop 116 is positioned in a vertical orientation and attached to an upper right corner of the back surface of upper brace panel 103. Forehead support retention loop 115 and forehead support retention loop 116 can work together with each other, and, optionally, with forehead support retention strap 114, to attach forehead support 104 to upper brace panel 103. Forehead support retention loop 115, forehead support retention loop 116, and forehead support retention strap 114 provide versatility to provide for connection of a variety of types of forehead support 104, as will be shown on further FIGs., as described below. Forehead support retention strap 114 can also provide retention of pillow 105 on the front surface of upper brace panel 103.

When lower brace panel 102 and upper brace panel 103 are rigidly joined at brace panel junction 109, brace locking strap 118, which is connected to lower brace panel 102, can be applied to brace locking strap fastener pad 117, which is connected to upper brace panel 103, to lock lower brace panel 102 and upper brace panel 103 in rigid connection. Hook and loop fastener material may be used to separably attach brace locking strap 118 to brace locking strap fastener pad 117.

Brace hinge strap 119 is connected to a left side of the upper edge of lower brace panel 102 and to a left side of the lower edge of upper brace panel 103. Brace hinge strap 120 is connected to a right side of the upper edge of lower brace panel 102 and to a right side of the lower edge of upper brace panel 103. Some slack is provided in brace hinge straps 119 and 120 to allow upper brace panel 103 and lower brace panel 102 to be pulled apart to disengage the couplers for the rigid stays that rigidly connect upper brace panel 103 and lower brace panel 102. However, brace hinge straps 119 and 120 limit the extent to which upper brace panel 103 and lower brace panel 102 can be pulled apart and provide guidance for folding of lower brace panel 102 with respect to upper brace panel 103 after the couplers have been disengaged.

Brace retention stitching instances 121 and 122 provide a tunnel within upper brace panel 103 to contain an upper left brace stay. Brace retention stitching instances 123 and 124 provide a tunnel within upper brace panel 103 to contain an upper right brace stay. Brace retention stitching instances 125 and 126 provide a tunnel within lower brace panel 102 to contain a lower left brace stay. Brace retention stitching instances 127 and 128 provide a tunnel within lower brace panel 102 to contain a lower right brace stay. Brace retention stitching instance 129 provides a pocket within lower brace panel 102 to contain a lower end of the lower left brace stay. Brace retention stitching instance 130 provides a pocket within lower brace panel 102 to contain a lower end of the lower right brace stay.

An elastic strap 131 is connected to and horizontally spans upper brace panel 102. Elastic strap 131 can slide over a handle of a carry-on bag to allow easy connection of the adjustable head and neck system to the carry-on bag and avoiding the need to carry the adjustable head and neck system as a separate piece of luggage. Elastic strap 131 can be used to hold the adjustable head and neck system closed in a reversed configuration (e.g., folded inside-out), which may be used to convert the adjustable head and neck system into a lumbar support device to support the lumbar vertebrae of the lower back when a person is seated. Elastic strap 131 can be used to hook to attachments while travelling or to store the adjustable head and neck system. While closure tab 112 can secure closure of the adjustable head and neck system in a stored configuration, elastic strap 131 can also be used to serve that function, either with or without closure tab 112.

In accordance with at least one embodiment, a cover is provided to protect portions of the adjustable head and neck system, such as at least one of a pillow, an upper brace panel, a lower brace panel, an anchor pad, and other components. The cover may have a closure, such as a zipper or a hook and loop fastener, to secure and seal the adjustable head and neck system in the storage configuration with elements protected from the surrounding environment. The cover may be implemented, as one example, by adding material and the closure around the periphery of existing elements and providing attachment thereto, or, as another example, by providing a separate cover in which to place the adjustable head and neck system.

In accordance with at least one embodiment, an adjustable head and neck system can be instantiated as an attachment to a piece of luggage. For example, the adjustable head and neck system can be provided with material and a zipper or hook and loop fastener, as described above, but with the piece of luggage provided with a corresponding fastener to receive the adjustable head and neck system as a separable attachment.

In accordance with at least one embodiment, an adjustable head and neck system can be instantiated in the form of a backpack having shoulder straps to allow the adjustable head and neck system to be worn on the user's back in a compact configuration in the form of a backpack. In accordance with at least one embodiment, the backpack straps can be reconfigurable to be used as straps, such as one or more thoracto-abdominal straps and one or more seat back straps to promote stability of the adjustable head and neck system in its deployed configuration.

Figure 4:
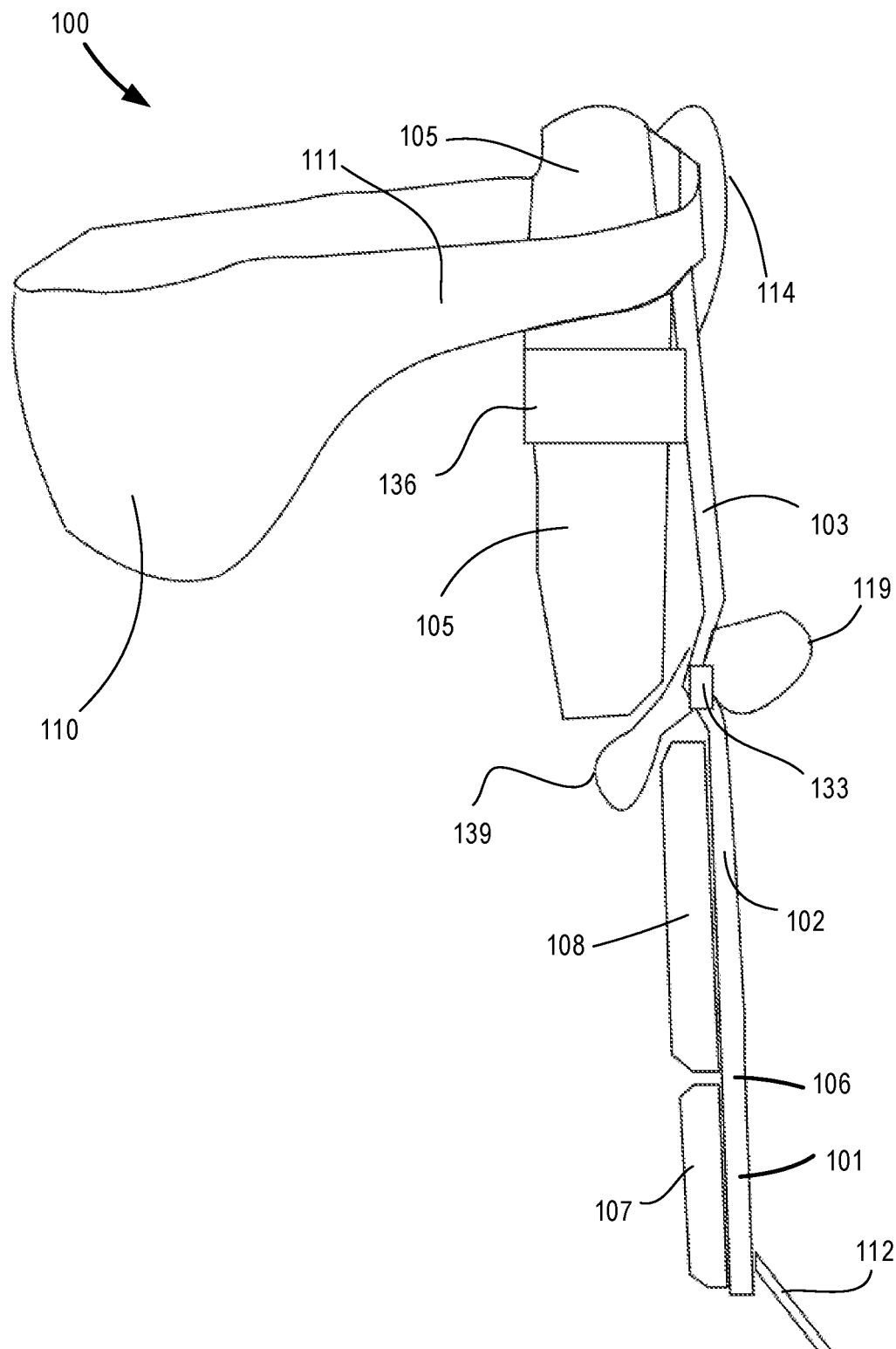
FIG. 4 is a left elevation view of the adjustable head and neck system in accordance with the embodiment shown in FIG. 1.

FIG. 4 is a left elevation view of the adjustable head and neck system in accordance with the embodiment shown in FIG. 1. Adjustable head and neck system 100 further comprises brace stay coupler 133, pillow retention strap 136, and brace hinge strap 139. Brace stay coupler 133 couples the upper left brace stay to the lower left brace stay. Pillow retention strap 136 retains a left portion of pillow 105. Brace hinge strap 139 is connected between a left side of an upper edge of lower brace panel 102 and a left side of a lower edge of upper brace panel 103 and lies in front of the brace stay coupler 133.

Figure 5:
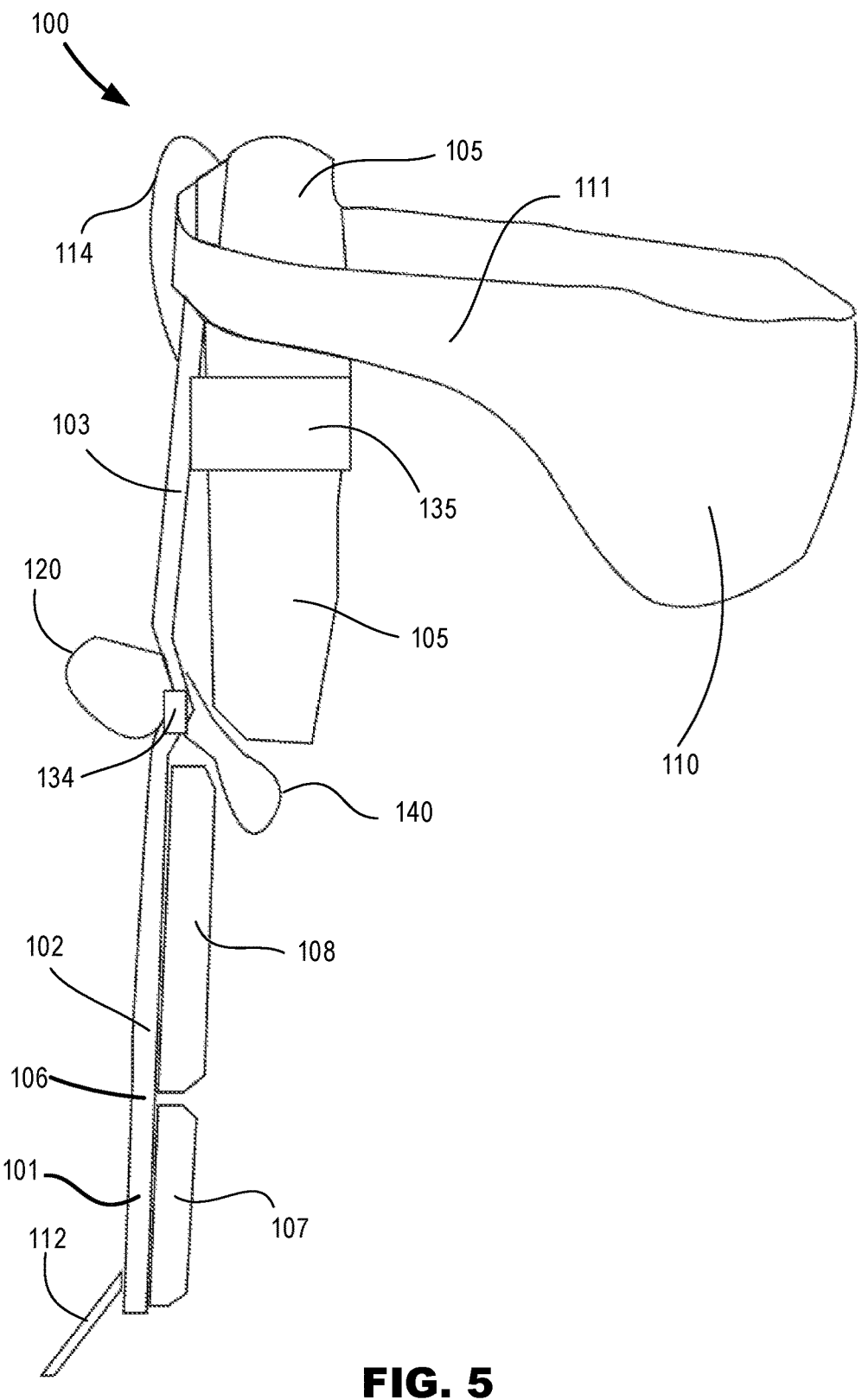
FIG. 5 is a right elevation view of the adjustable head and neck system in accordance with the embodiment shown in FIG. 1.

FIG. 5 is a right elevation view of the adjustable head and neck system in accordance with the embodiment shown in FIG. 1. Adjustable head and neck system 100 further comprises brace stay coupler 134, pillow retention strap 135, and brace hinge strap 140. Brace stay coupler 134 couples the upper right brace stay to the lower right brace stay. Pillow retention strap 135 retains a right portion of pillow 105. Brace hinge strap 140 is connected between a right side of an upper edge of lower brace panel 102 and a right side of a lower edge of upper brace panel 103 and lies in front of the brace stay coupler 134.

Figure 6:
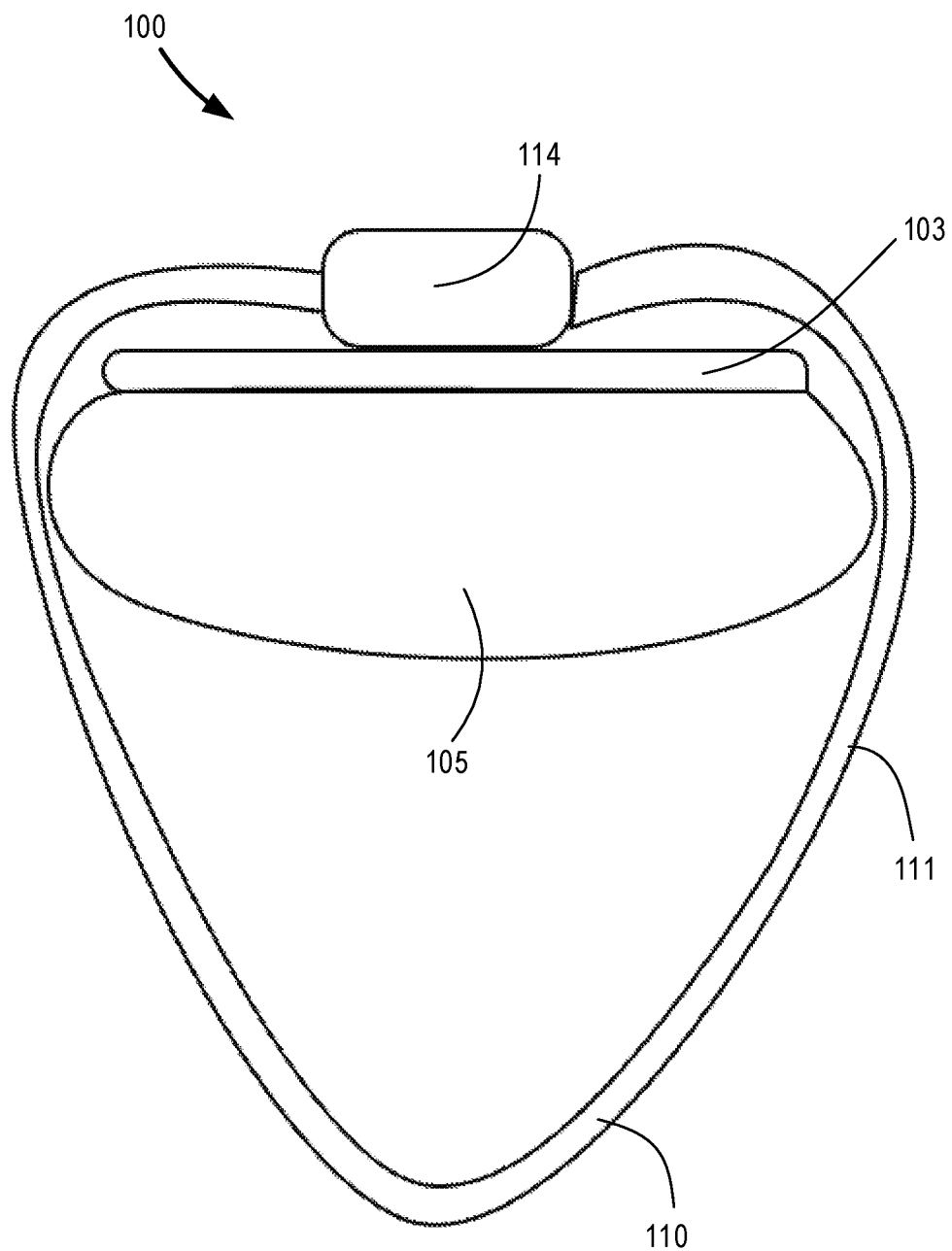
FIG. 6 is a top plan view of the adjustable head and neck system in accordance with the embodiment shown in FIG. 1.

FIG. 6 is a top plan view of the adjustable head and neck system in accordance with the embodiment shown in FIG. 1. FIG. 6 shows eye mask strap 111 being retained by forehead support retention strap 114. As can be seen pillow 105, eye mask 110, and eye mask strap 111 surround an open area configured to accommodate a user's head.

Figure 7:
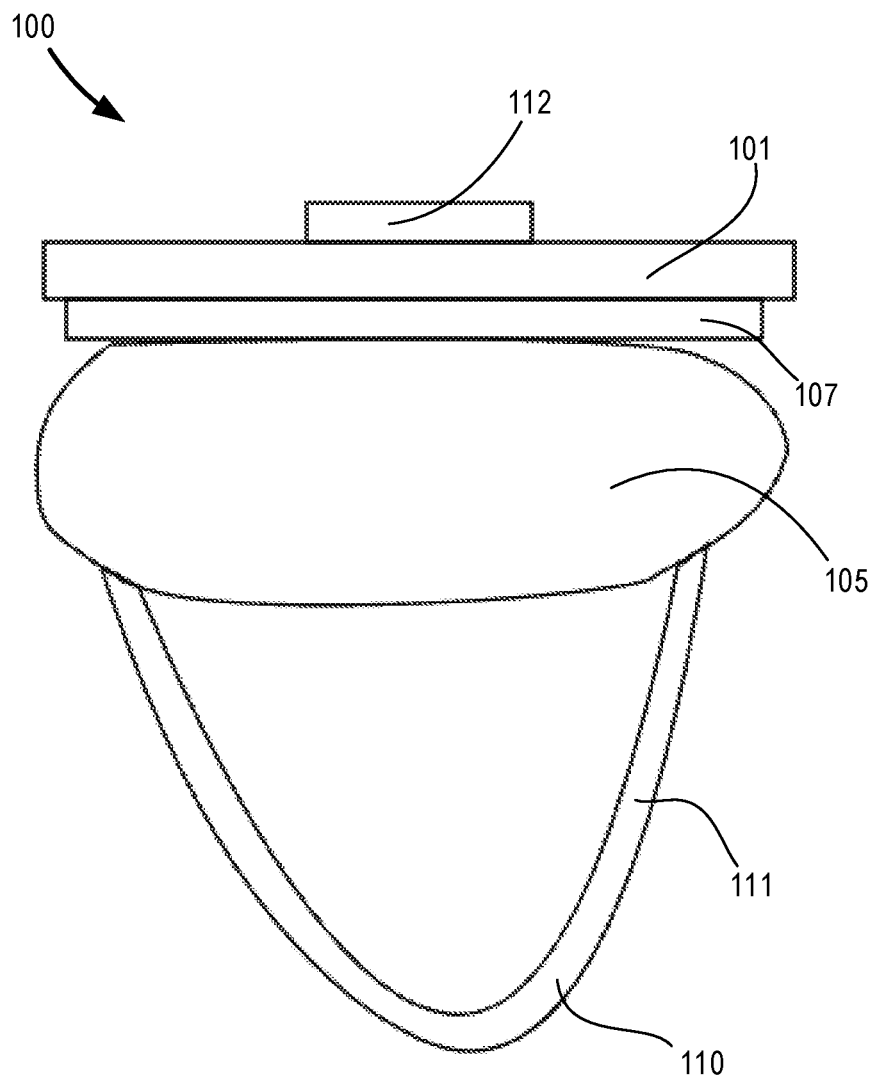
FIG. 7 is a bottom plan view of the adjustable head and neck system in accordance with the embodiment shown in FIG. 1.

FIG. 7 is a bottom plan view of the adjustable head and neck system in accordance with the embodiment shown in FIG. 1. FIG. 7 show elements already described above from a different view.

Figure 8:
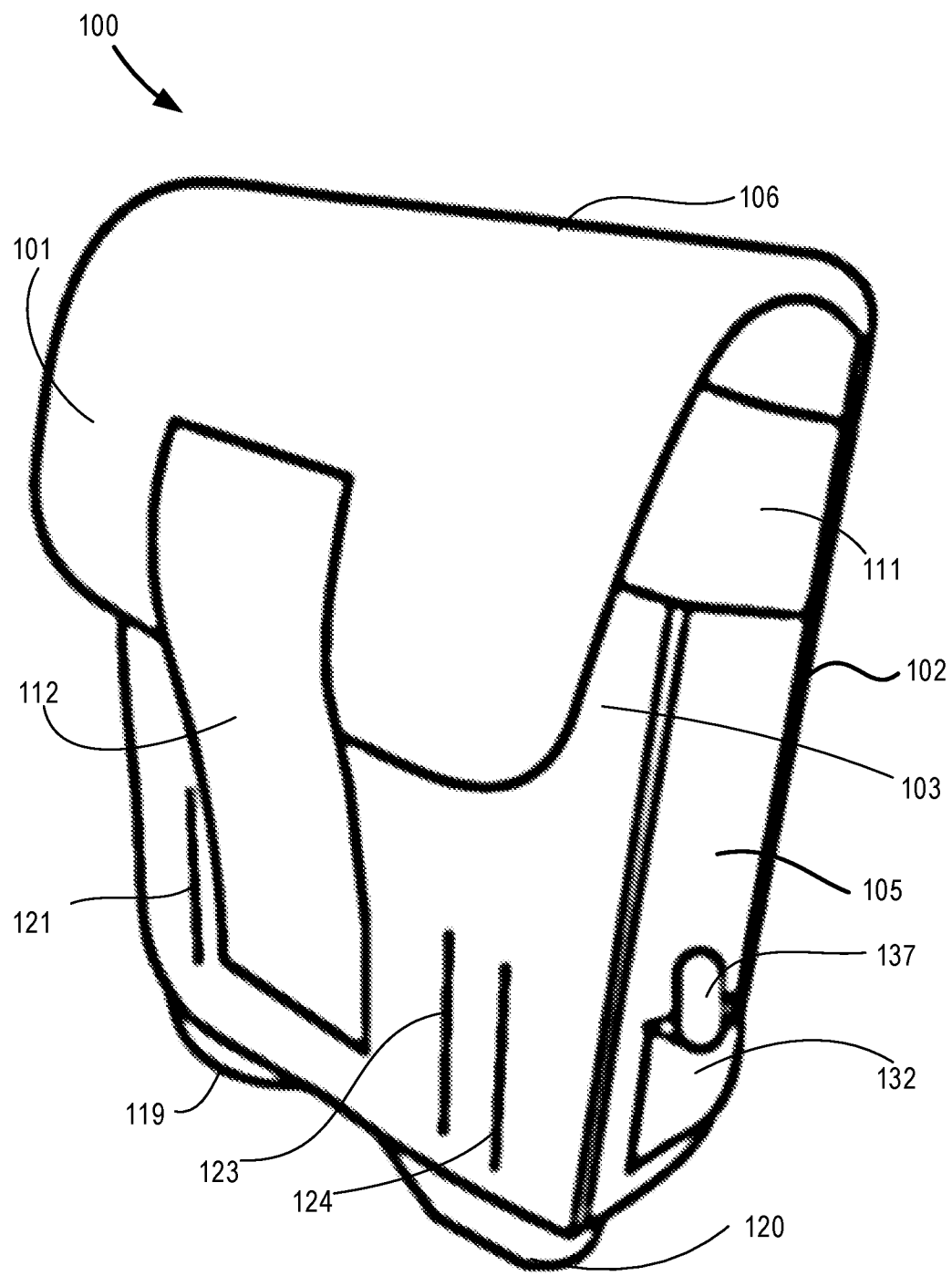
FIG. 8 is a perspective view of the adjustable head and neck system in accordance with the embodiment shown in FIG. 1 in a stored configuration.

FIG. 8 is a perspective view of the adjustable head and neck system in accordance with the embodiment shown in FIG. 1 in a stored configuration. When not in use, the adjustable head and neck system can be conveniently folded into a compact form in its stored configuration, according to at least one embodiment. Brace hinge straps 119 and 120 provide a limited hinge action to allow upper brace panel 103 and lower brace panel 102 to be folded around pillow 105. Flexible junction 106 allows anchor pad 101 to be folded into a flap to partially cover upper brace panel 103. A hook and loop fastener arrangement permits closure tab 112 to be separably attached to upper brace panel 103. Anchor pad 101 covers eye mask 110, leaving only a small amount of eye mask strap 111 exposed. A label sewed on three sides, leaving one side open, forms pocket 132 on the side of pillow 105. Pocket 132 can be used, for example, to store ear plugs 137, which, along with eye mask 111 help reduce sensory input to promote rest, such as sleep.

Figure 9:
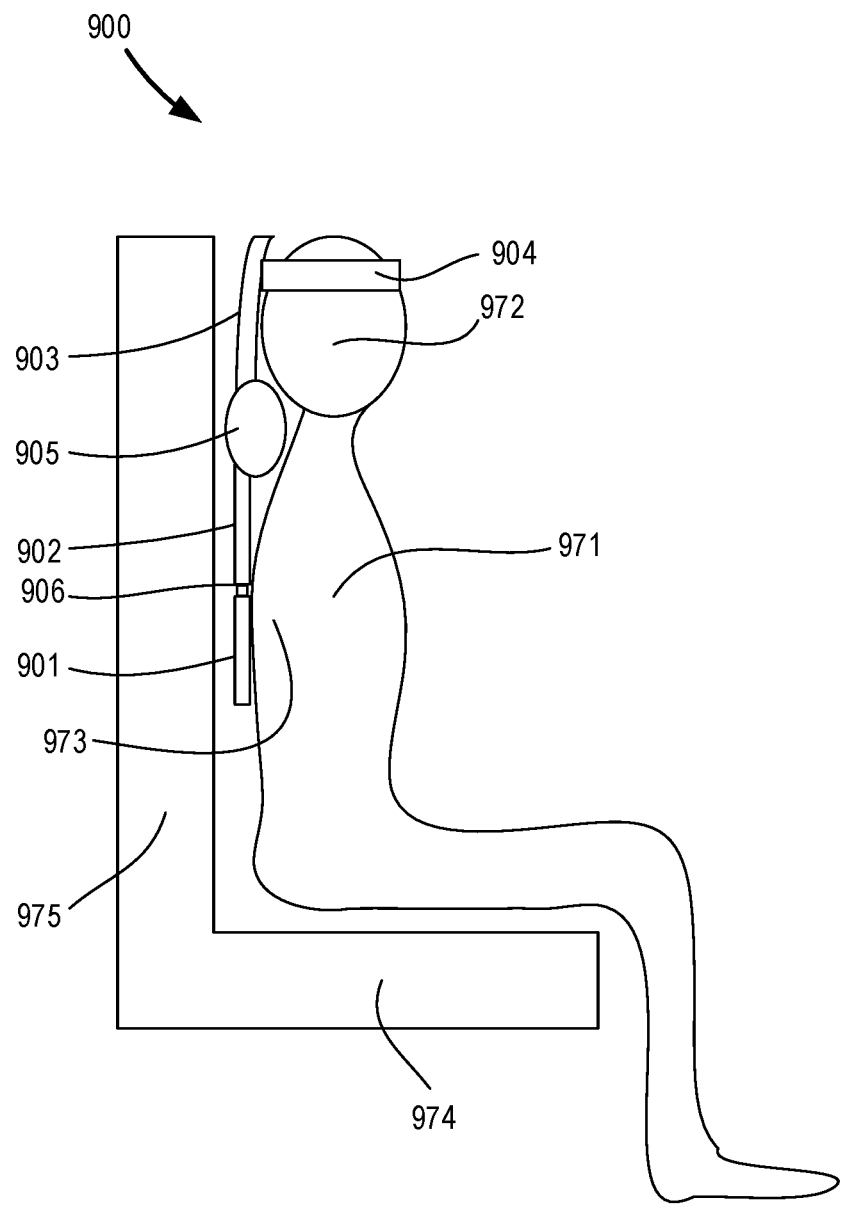
FIG. 9 is a right elevation view of an adjustable head and neck system comprising a headband in accordance with at least one embodiment.

FIG. 9 is a right elevation view of an adjustable head and neck system comprising a headband in accordance with at least one embodiment. Adjustable head and neck system 900 comprises anchor pad 901, flexible junction 906, lower brace panel 902, pillow 905, upper brace panel 903, and forehead support 904. Forehead support 904 is attached around a head 972 of user 971. Anchor pad 901 is anchored by the pressure of the back 973 of user 971 against a back 975 of seat 974. Neck support 905 is applied to the neck of user 971. In FIG. 9, forehead support 904 is a head band that does not occlude the eyes of user 971.

Figure 10:
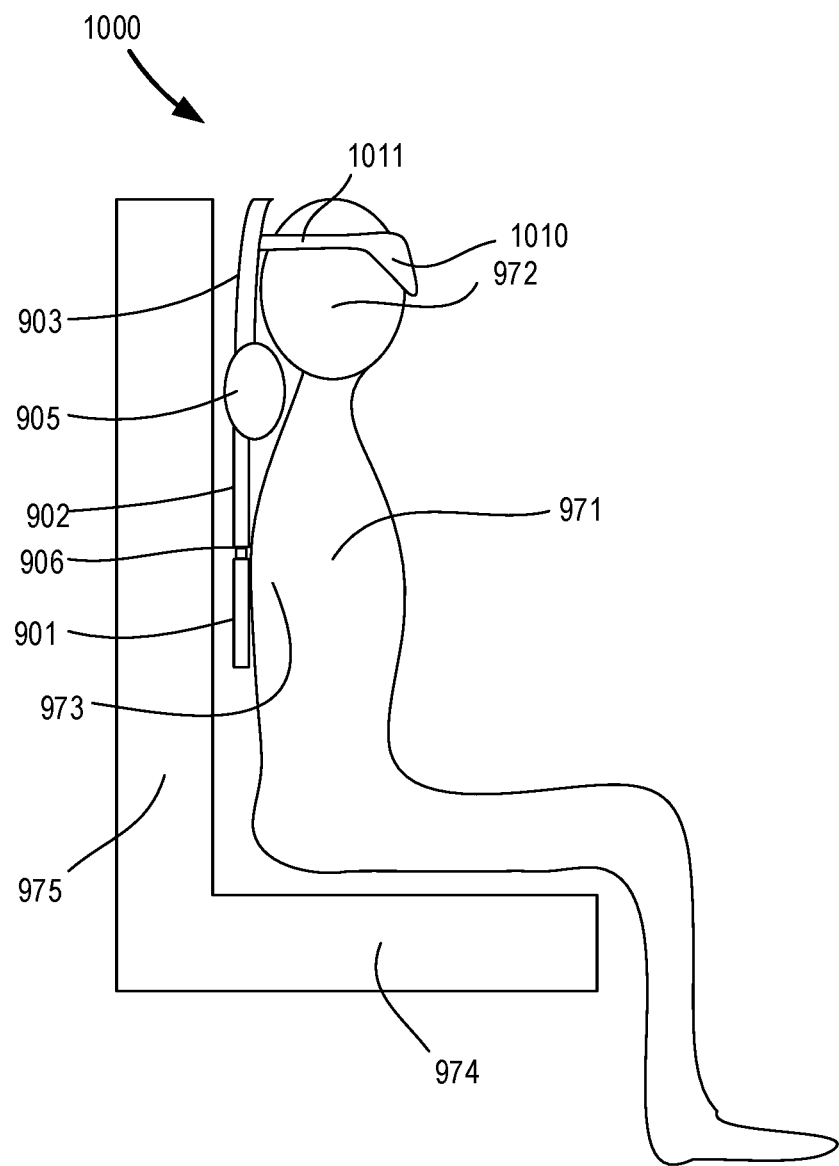
FIG. 10 is a right elevation view of an adjustable head and neck system comprising an eye mask in accordance with at least one embodiment.

FIG. 10 is a right elevation view of an adjustable head and neck system comprising an eye mask in accordance with at least one embodiment. In FIG. 10, for adjustable head and neck system 1000, forehead support 904 comprises eye mask 1010 and eye mask strap 1011.

Figure 11:
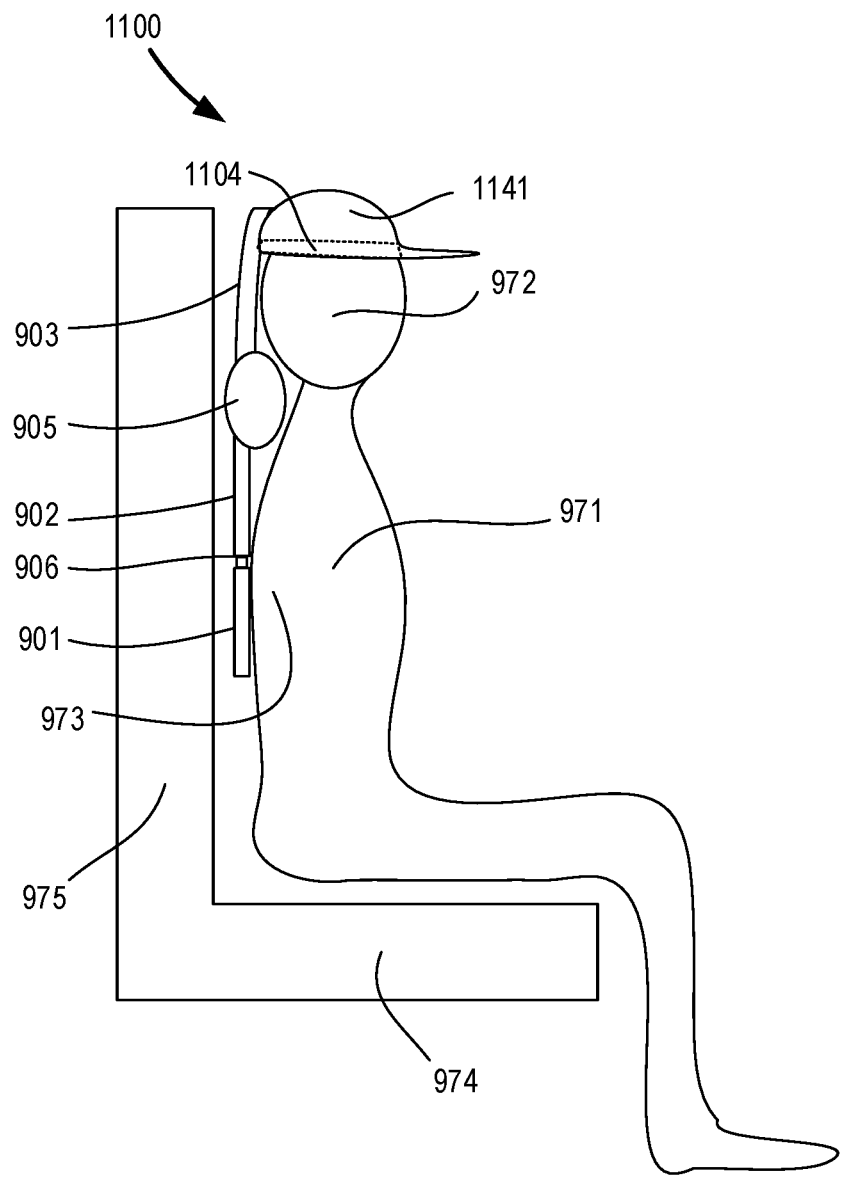
FIG. 11 is a right elevation view of an adjustable head and neck system comprising a cap in accordance with at least one embodiment.

FIG. 11 is a right elevation view of an adjustable head and neck system comprising a cap in accordance with at least one embodiment. In FIG. 11, for adjustable head and neck system 1100, forehead support 904 comprises cap band 1104 and cap 1141. The forehead support retention elements described with respect to FIGS. 1-8 permit a wide range of headgear, including user-supplied headgear, to be used with the adjustable head and neck system. The headgear need not be specifically designed to work with the adjustable head and neck system, but its use with the system is still possible.

Figure 12:
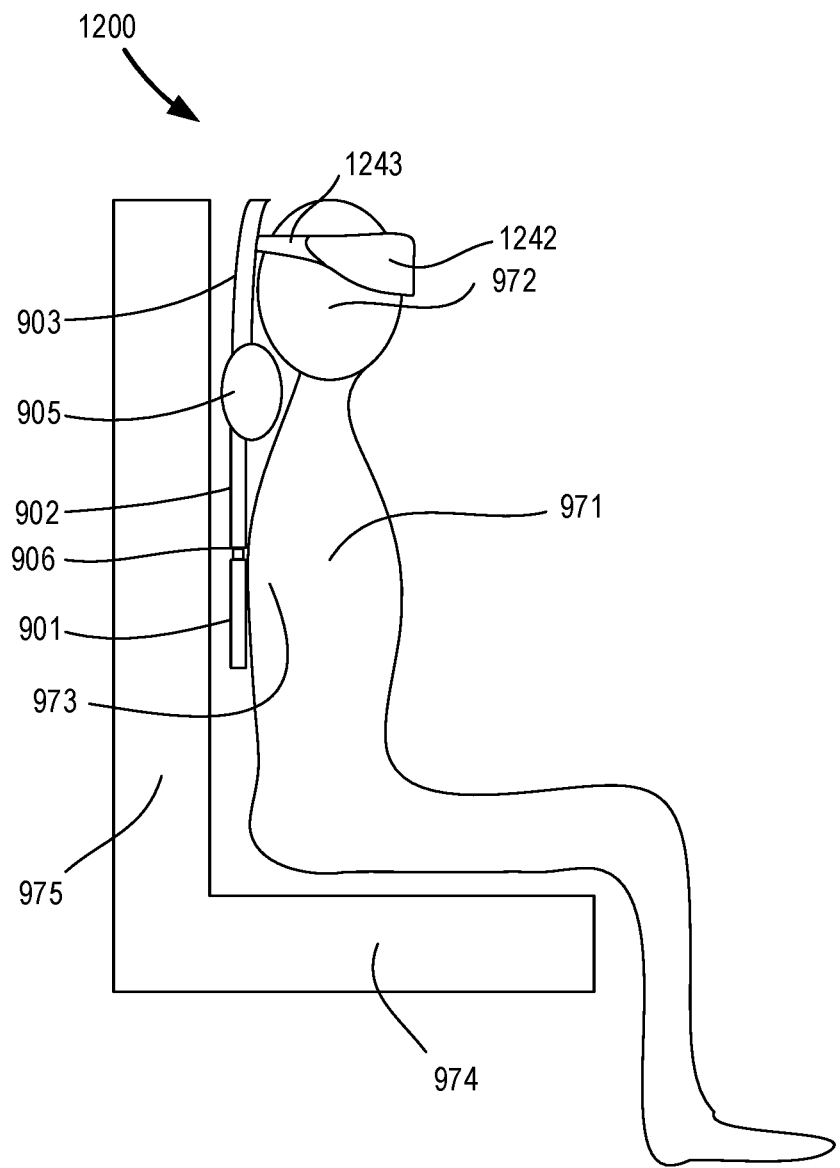
FIG. 12 is a right elevation view of an adjustable head and neck system comprising video display eyewear in accordance with at least one embodiment.

FIG. 12 is a right elevation view of an adjustable head and neck system comprising video display eyewear in accordance with at least one embodiment. In FIG. 12, for adjustable head and neck system 1200, forehead support 904 comprises video display eyewear 1242 and video display eyewear strap 1243. As examples, video display eyewear 1242 can include virtual reality (VR) and augmented reality (VR) video display goggles, video display glasses, and the like.

Figure 13:
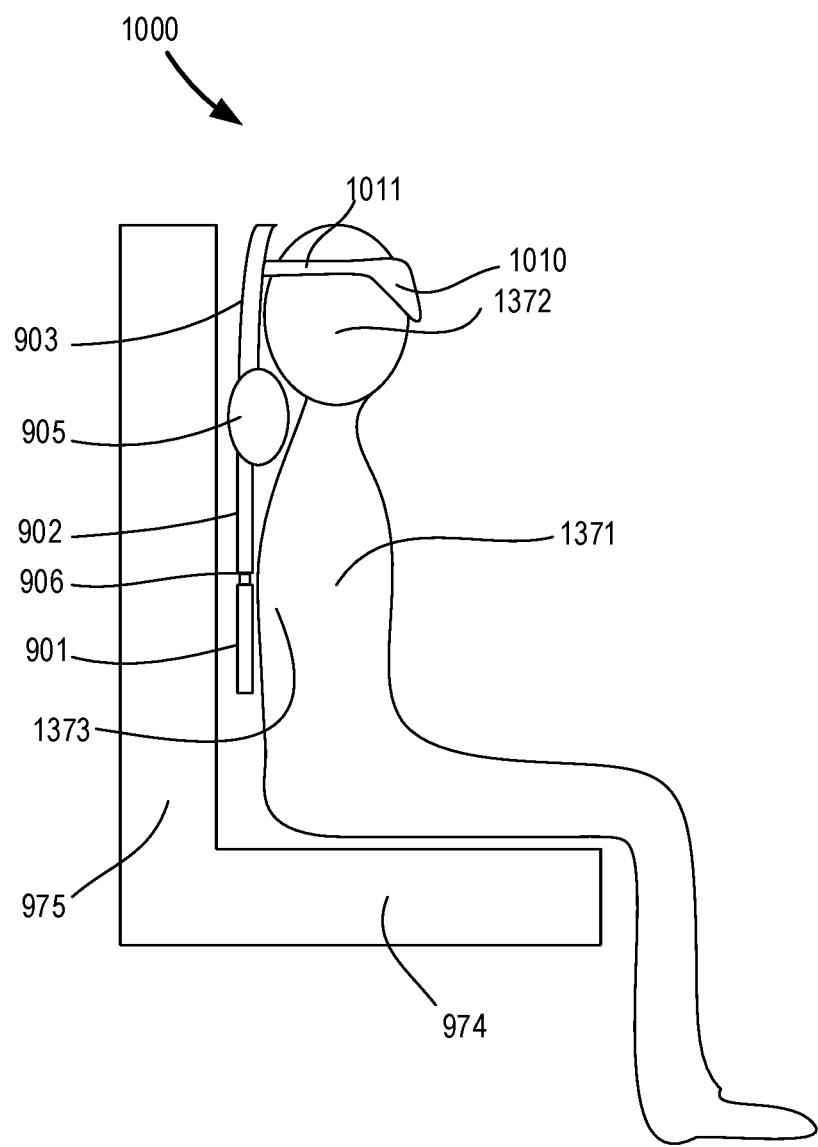
FIG. 13 is a right elevation view of the adjustable head and neck system of FIG. 10 as worn by a shorter person, such as a youth, in accordance with at least one embodiment.

FIG. 13 is a right elevation view of the adjustable head and neck system of FIG. 10 as worn by a shorter person, such as a youth, in accordance with at least one embodiment. As can be seen when adjustable head and neck system 1000 is worn by a shorter person 1371, having head 1372 and back 1373, anchor pad 901 is closer to seat 974 but does not extend so far as to interfere with the operation of adjustable head and neck system 1000.

Figure 14:
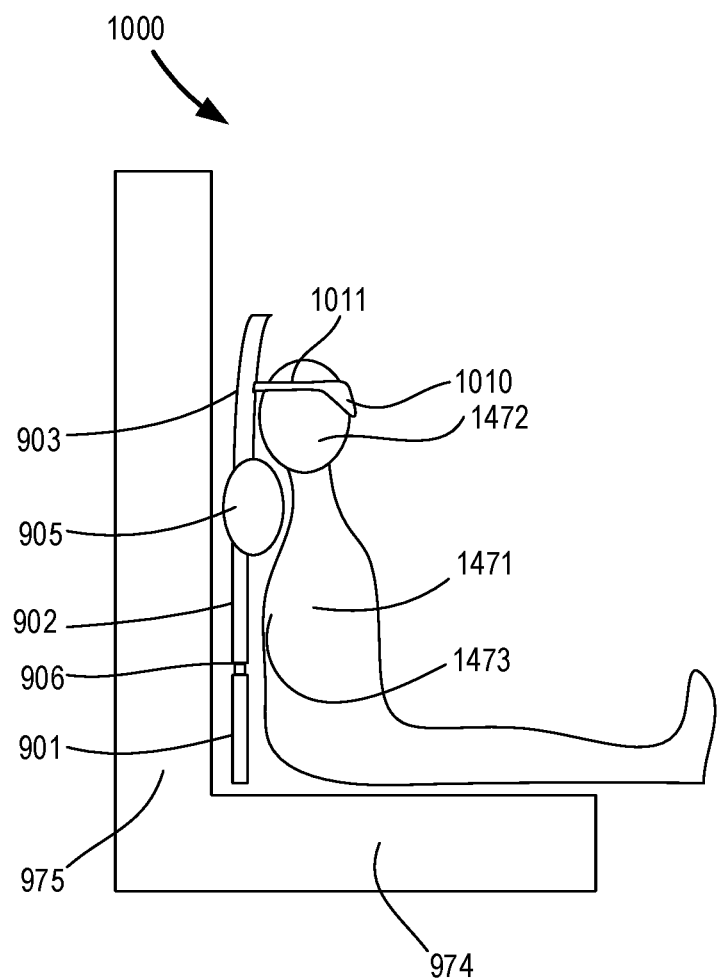
FIG. 14 is a right elevation view of the adjustable head and neck system of FIG. 10 as worn by a small child, in accordance with at least one embodiment.

FIG. 14 is a right elevation view of the adjustable head and neck system of FIG. 10 as worn by a small child, in accordance with at least one embodiment. As can be seen when adjustable head and neck system 1000 is worn by a very short person 1471, having head 1472 and back 1473, such as a small child, anchor pad 901 is very close to seat 974 but does not extend so far as to interfere with the operation of adjustable head and neck system 1000. Thus, a single implementation of the adjustable head and neck system can accommodate a wide range of users of various sizes and anatomical configurations. For even smaller persons, such as babies, a smaller version of the adjustable head and neck system 1000 can be provided. As babies are often carried in baby seats, a cooperative feature, for example, a strip of hook or loop fastener, can be incorporated into a baby seat to separably attach the adjustable head and neck system 1000 to the baby seat in proper position.

Figure 15:
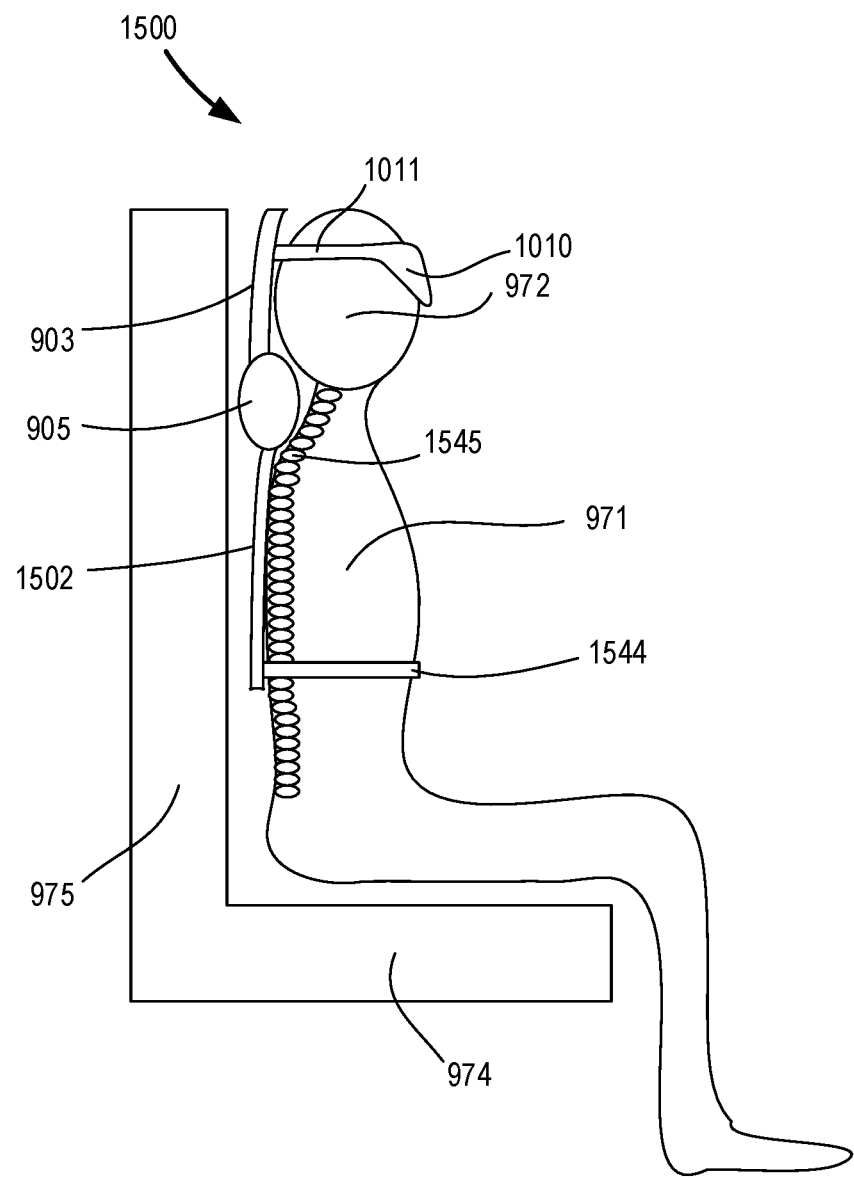
FIG. 15 is a right elevation view of an adjustable head and neck system featuring an anchor pad strap and also featuring an anchor pad configured to conform to a user's spinal column, in accordance with at least one embodiment.

FIG. 15 is a right elevation view of an adjustable head and neck system featuring an anchor pad strap and also featuring an anchor pad configured to conform to a user's spinal column, in accordance with at least one embodiment. Adjustable head and neck system 1500 comprises a lower brace and anchor structure 1502 configured to anatomically conform to spine 1545 of user 971. Adjustable head and neck system 1500 also comprises thoracto-abdominal strap 1544, which may be strapped around the thorax or abdomen of user 971, to further enhance conformance of lower brace and anchor structure 1502 to user 971, regardless of whether user 971 is standing, sitting, or in another position.

FIG. 16 is a right elevation view of an adjustable head and neck system in accordance with at least one embodiment. The elements shown in FIG. 16 have been shown and described with respect to FIGS. 9-14.

FIG. 17 is a right elevation view of the adjustable head and neck system of FIG. 16 configured to be folded in a rearward direction in accordance with at least one embodiment. As can be seen, adjustable head and neck system 1000 can be configured to adjust or fold backward.

FIG. 18 is a right elevation view of the adjustable head and neck system of FIG. 16 configured to be folded in a forward direction in accordance with at least one embodiment. As can be seen, adjustable head and neck system 1000 can be configured to adjust or fold forward.

FIG. 19 is a right elevation view of the adjustable head and neck system of FIG. 16 configured to extended and retracted in a vertical direction in accordance with at least one embodiment. As can be seen, adjustable head and neck system 1000 can be configured to adjust or be reduced or expanded in vertical size. As an example, telescopic elements and latches may be used to achieve such a capability.

Figure 20:
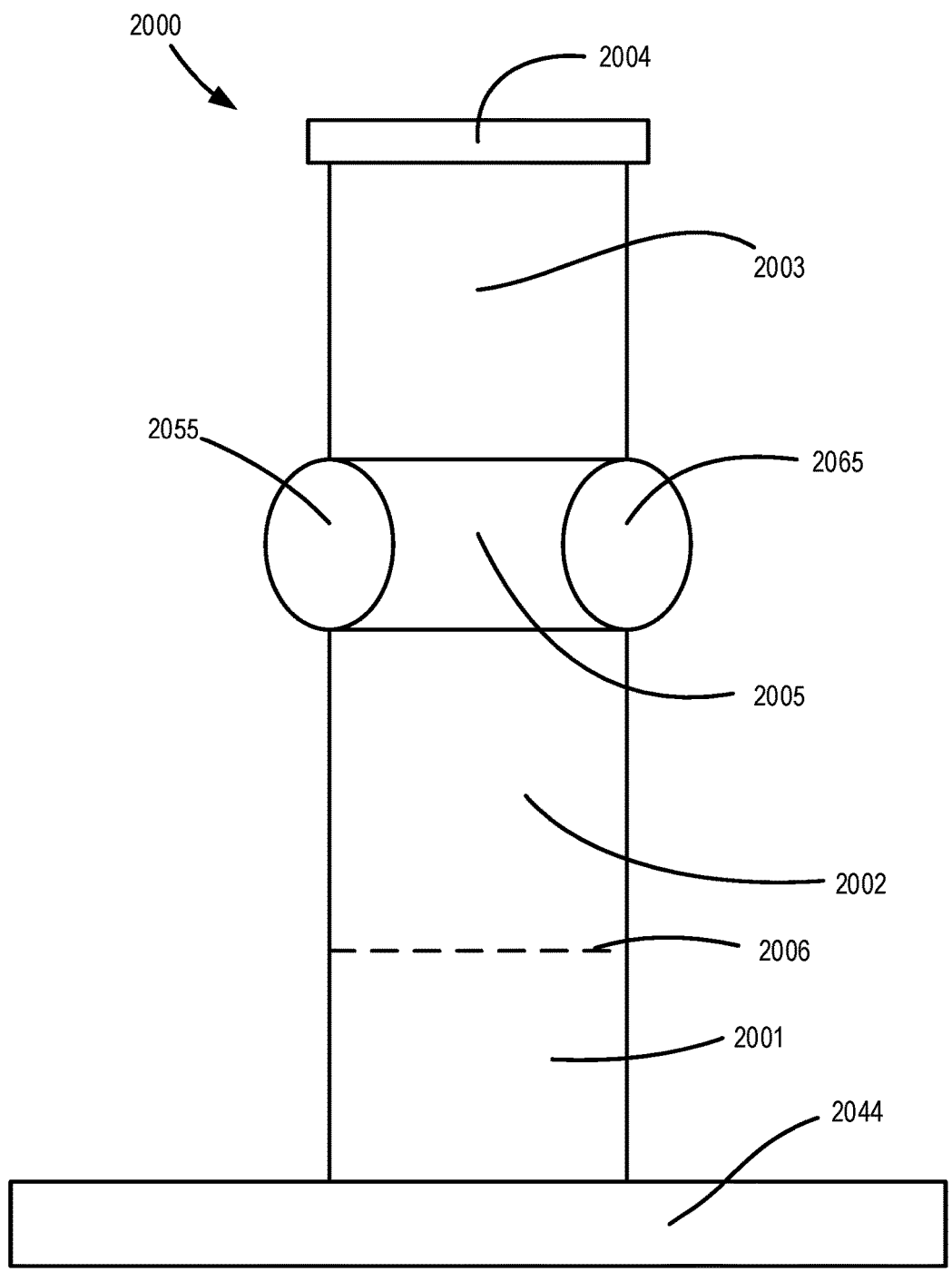
FIG. 20 is a front elevation view of an adjustable head and neck system featuring an anchor pad strap in accordance with at least one embodiment.

FIG. 20 is a front elevation view of an adjustable head and neck system featuring an anchor pad strap in accordance with at least one embodiment. Adjustable head and neck system 2000 comprises thoracto-abdominal strap 2044, anchor pad 2001, flexible junction 2006, lower brace panel 2002, pillow 2005, upper brace panel 2003, and forehead support 2004. Pillow 2005 may comprise a left side pillow portion 2065 and a right side pillow portion 2055. Thoracto-abdominal strap 2044 is connected to a lower edge of anchor pad 2001. An upper edge of anchor pad 2001 is connected to a lower edge of lower brace panel 2002 at flexible junction 2006. An upper edge of lower brace panel 2002 is connected to upper brace panel 2003. Pillow 2005 can be connected to lower brace panel 2002, upper brace panel 2003, or both. Forehead support 2004 is connected to upper brace panel 2003.

Figure 21:
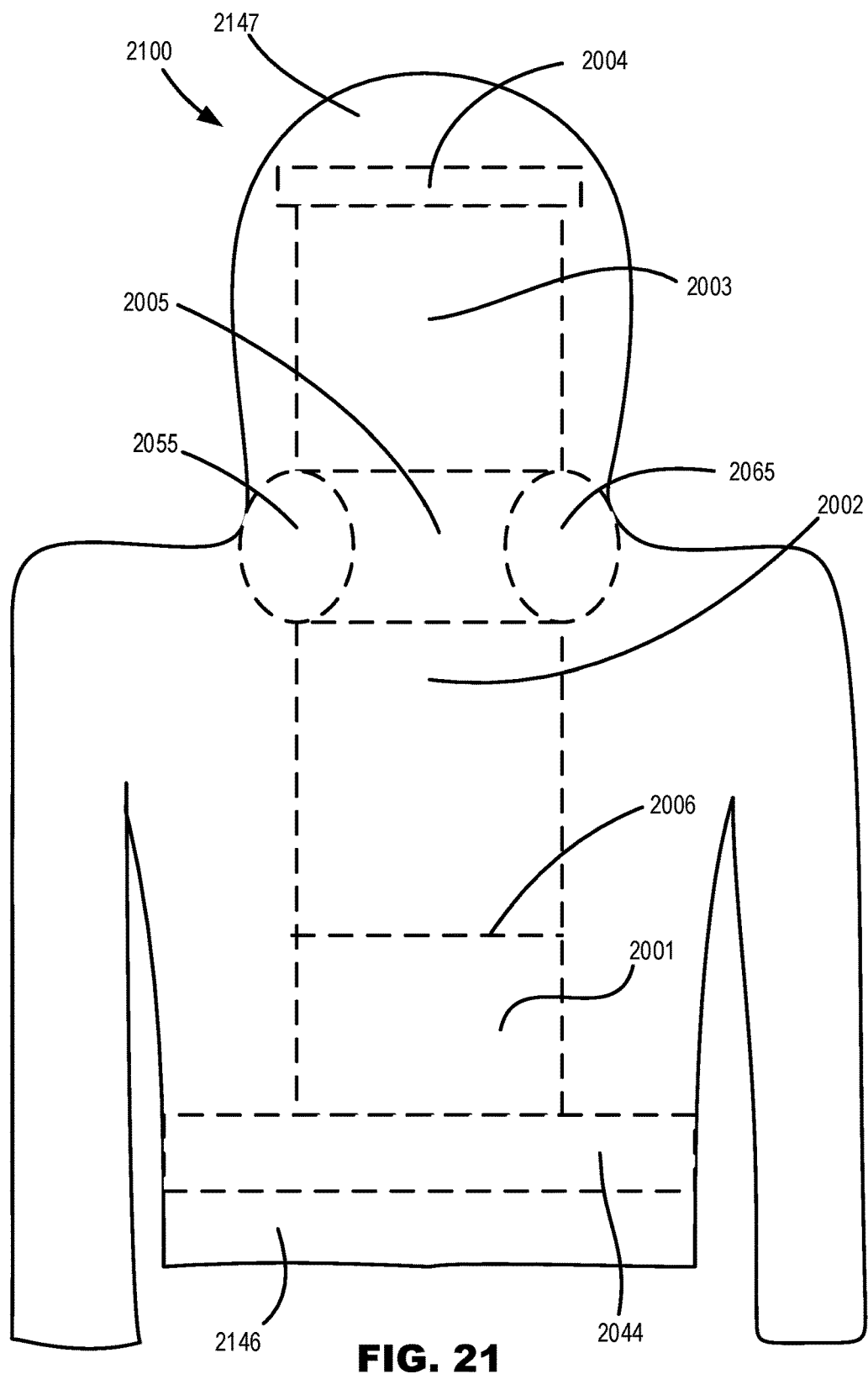
FIG. 21 is a front elevation view of a hooded garment incorporating an adjustable head and neck system in accordance with at least one embodiment.

FIG. 21 is a front elevation view of a hooded garment incorporating an adjustable head and neck system in accordance with at least one embodiment. Adjustable head and neck system 2100 is adjustable head and neck system 2000 as instantiated in hooded garment 2146. Hood 2147 of hooded garment 2146 can be configured to operate in concert with adjustable head and neck system 2000. For example, hood 2147 can be attached to upper brace panel 2003, forehead support 2004, or both. Hood 2147 can be arranged to extend upper brace panel 2003 when hood 2147 is placed over the user's head and to retract upper brace panel 2003 when hood 2147 is removed from the user's head.

Figure 22:
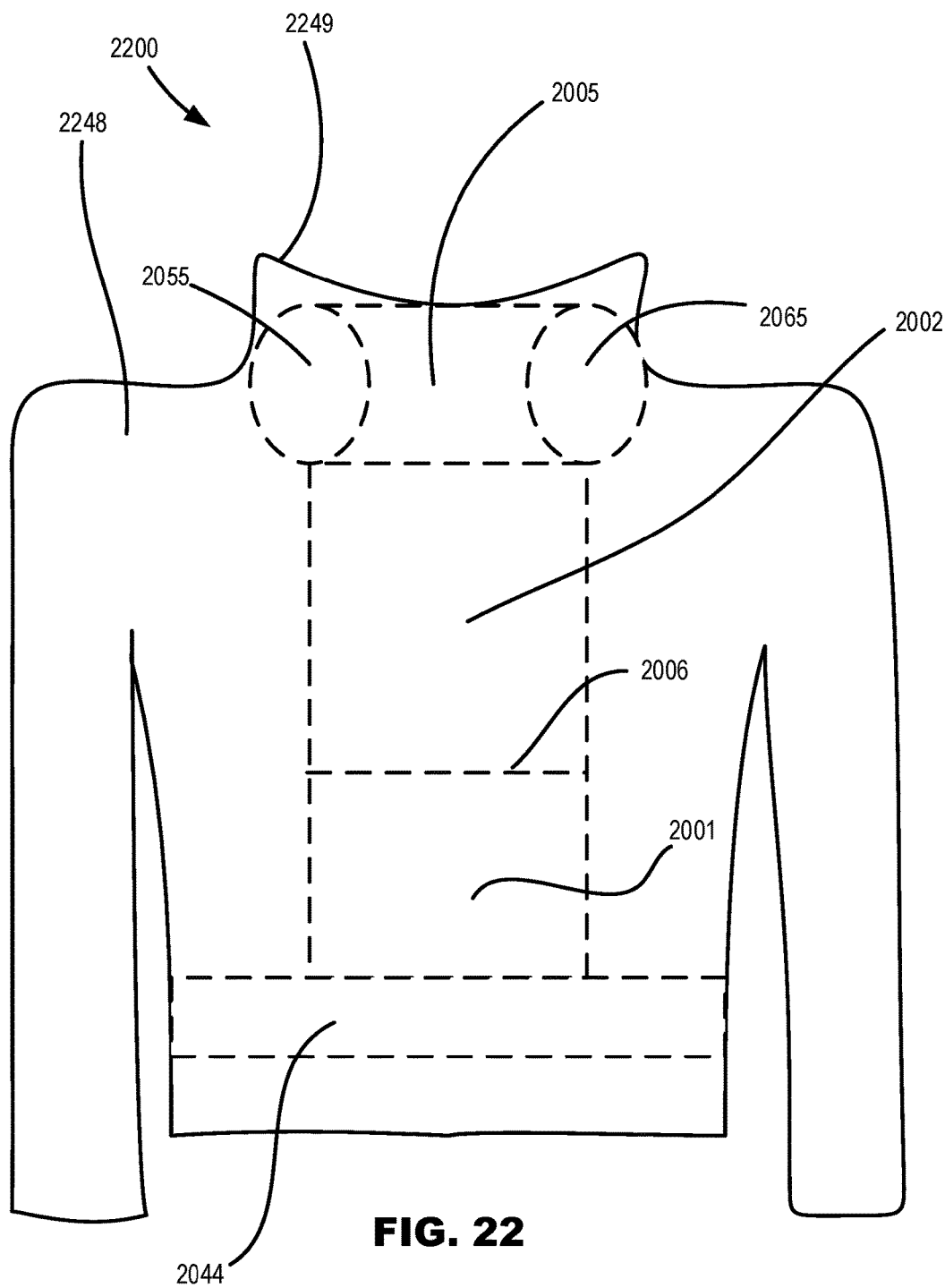
FIG. 22 is a front elevation view of a garment incorporating an adjustable head and neck system in accordance with at least one embodiment.

FIG. 22 is a front elevation view of a garment incorporating an adjustable head and neck system in accordance with at least one embodiment. Adjustable head and neck system 2200 is adjustable head and neck system 2000 as instantiated in garment 2248. In an example where garment 2248 is a hooded garment with the hood removed from the user's head, as shown by collar edge 2249, upper brace panel 2003 is correspondingly retracted, as shown. In another example, where garment 2248 need not be a hooded garment, upper brace panel 2003 can be retracted and extended manually.

Figure 23:
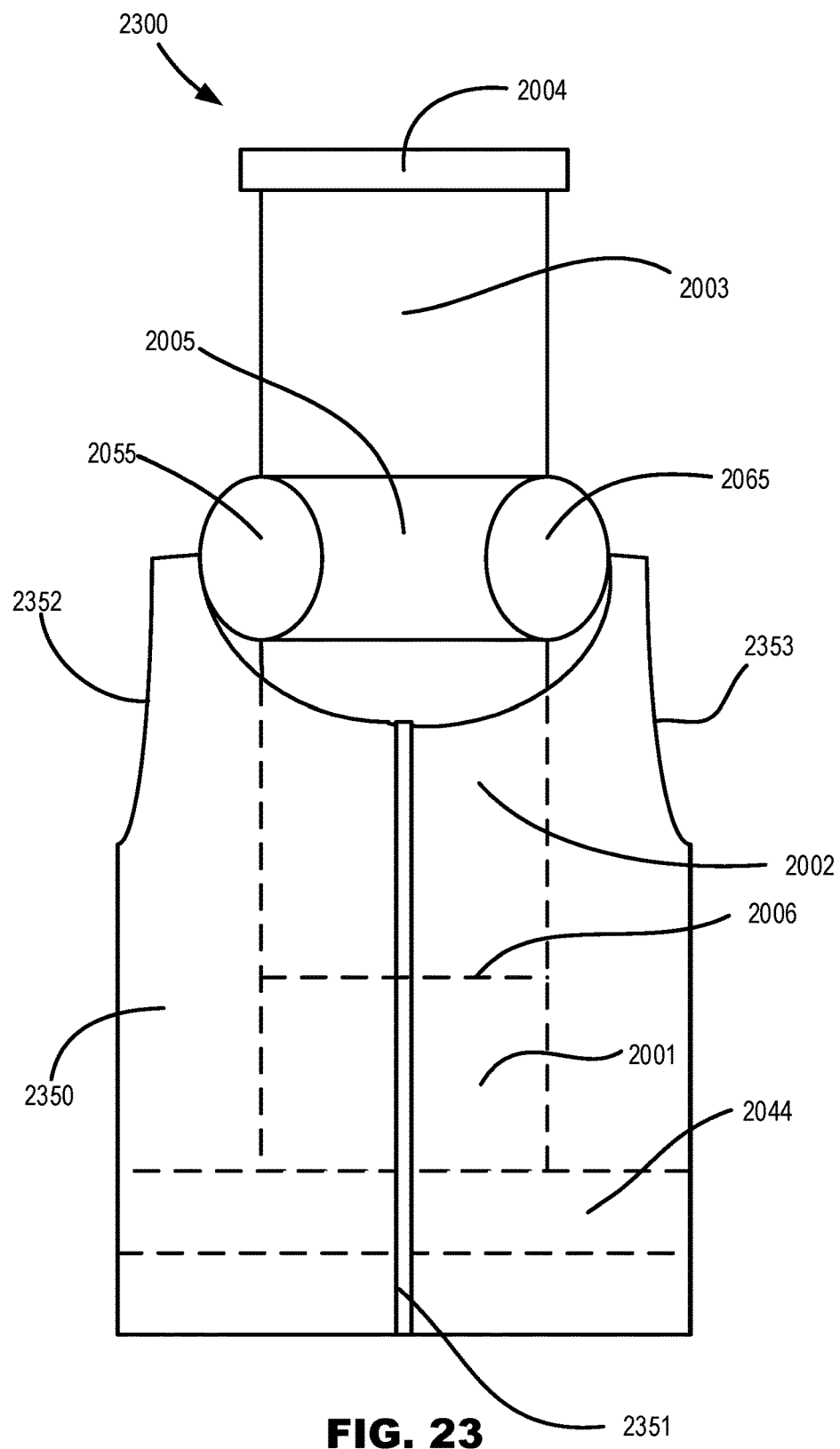
FIG. 23 is a front elevation view of a vest incorporating an adjustable head and neck system in accordance with at least one embodiment.

FIG. 23 is a front elevation view of a vest incorporating an adjustable head and neck system in accordance with at least one embodiment. Adjustable head and neck system 2300 is adjustable head and neck system 2000 as instantiated in vest 2350. Vest 2350 comprises zipper 2351 and defines left arm hole 2353 and right arm hole 2352. As with jackets, hoodies, vests, and the like, thoracto-abdominal strap 2044 can be integrated into the garment to allow donning and doffing of the garment to apply and remove thoracto-abdominal strap 2044 to and from the user. Other features of adjustable head and neck system 2300 can be attached to features of the garment to stabilize the positional relationship between the user wearing the garment and adjustable head and neck system 2300.

Figure 24:
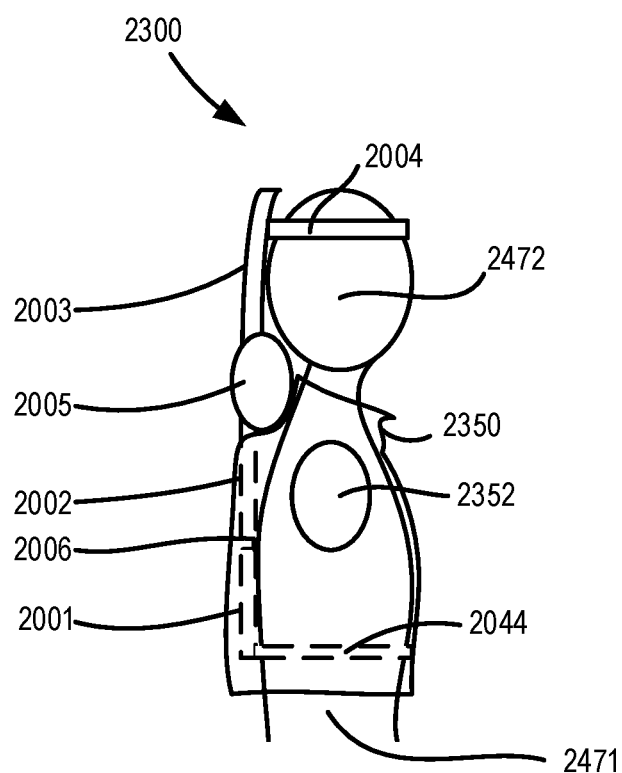
FIG. 24 is a right elevation view of the vest of FIG. 23 incorporating an adjustable head and neck system in accordance with at least one embodiment.

FIG. 24 is a right elevation view of the vest of FIG. 23 incorporating an adjustable head and neck system in accordance with at least one embodiment. FIG. 24 depicts user 2471, having head 2472, wearing vest 2350 with proper engagement of adjustable head and neck system 2300.

Figure 25:
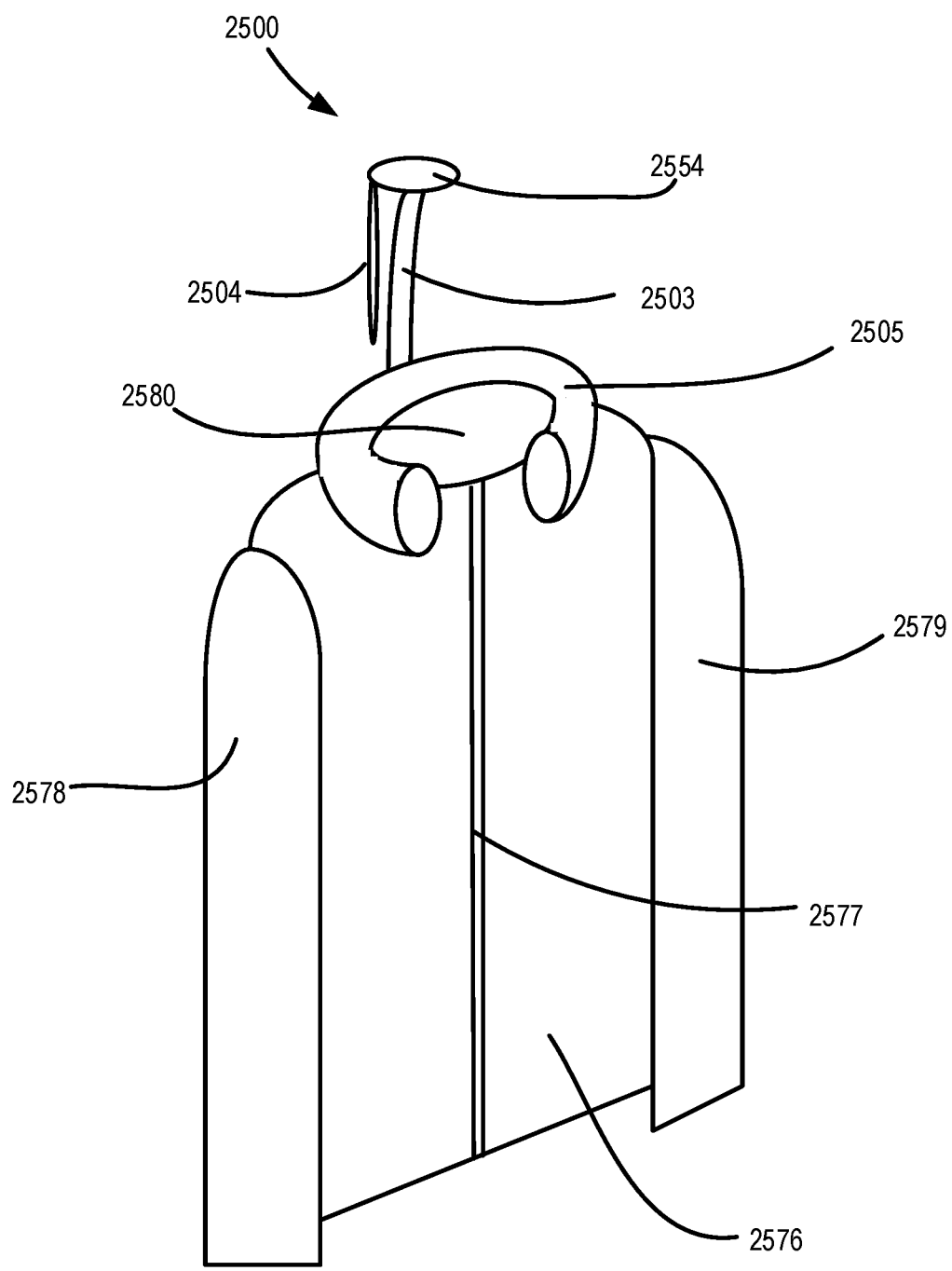
FIG. 25 is a perspective view of a garment incorporating an adjustable head and neck system in accordance with at least one embodiment.

FIG. 25 is a perspective view of a garment incorporating an adjustable head and neck system in accordance with at least one embodiment. Adjustable head and neck system 2500 is instantiated in garment 2576. Garment 2576 comprises closure 2577, which may, for example, be a zipper. Garment 2576 comprises left sleeve 2579 and right sleeve 2578. Garment 2576 comprises collar 2505, which may be in the form of a pillow capable of functioning as a neck support, a head support, or both. Collar 2505 defines a hole 2580 for the user's neck and head. Adjustable head and neck system 2500 further comprises upper brace 2503. Upper brace 2503 is selectively extensible from garment 2576. Upper brace 2503 is attached, at its upper end, to head support 2554. Head support 2554 is coupled to forehead support 2504, shown hanging limp, as no user's head is shown for it to engage so as not to block the view of the disclosed elements.

Figure 26:
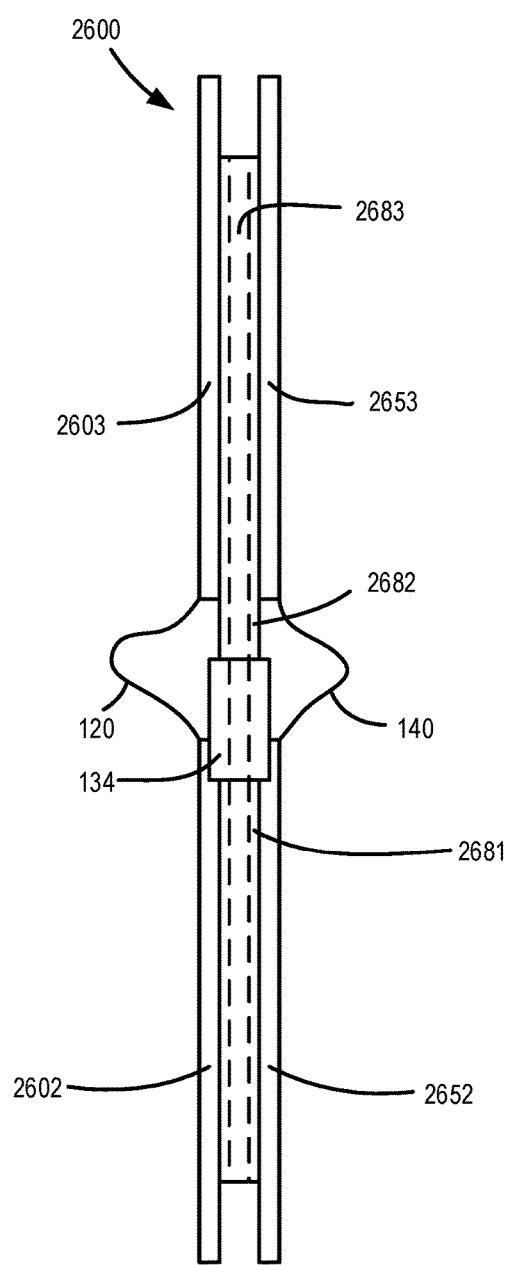
FIG. 26 is a cross-sectional view of a brace component of an adjustable head and neck system in an engaged configuration in accordance with at least one embodiment.

FIG. 26 is a cross-sectional view of a brace component of an adjustable head and neck system in an engaged configuration in accordance with at least one embodiment. Brace component 2600 comprises upper brace stay 2682 contained between rear layer 2603 and front layer 2653 of an upper brace panel. Brace component 2600 further comprises lower brace stay 2681 contained between rear layer 2602 and front layer 2652 of a lower brace panel. Upper brace stay 2682 is separably rigidly connected to lower brace stay 2681 by brace stay coupler 134. A front brace hinge strap 140 is connected from a lower edge of front layer 2653 of the upper brace panel to an upper edge of front layer 2652 of the lower brace panel. A rear brace hinge strap 120 is connected from a lower edge of rear layer 2603 of the upper brace panel to an upper edge of rear layer 2602 of the lower brace panel. A lumen is defined continuously through and between upper brace stay 2682 and lower brace stay 2681. An elastic cord, such as a shock cord, is disposed in the lumen to provide tension to help draw together and align one of the brace stays with the brace stay coupler.

Figure 27:
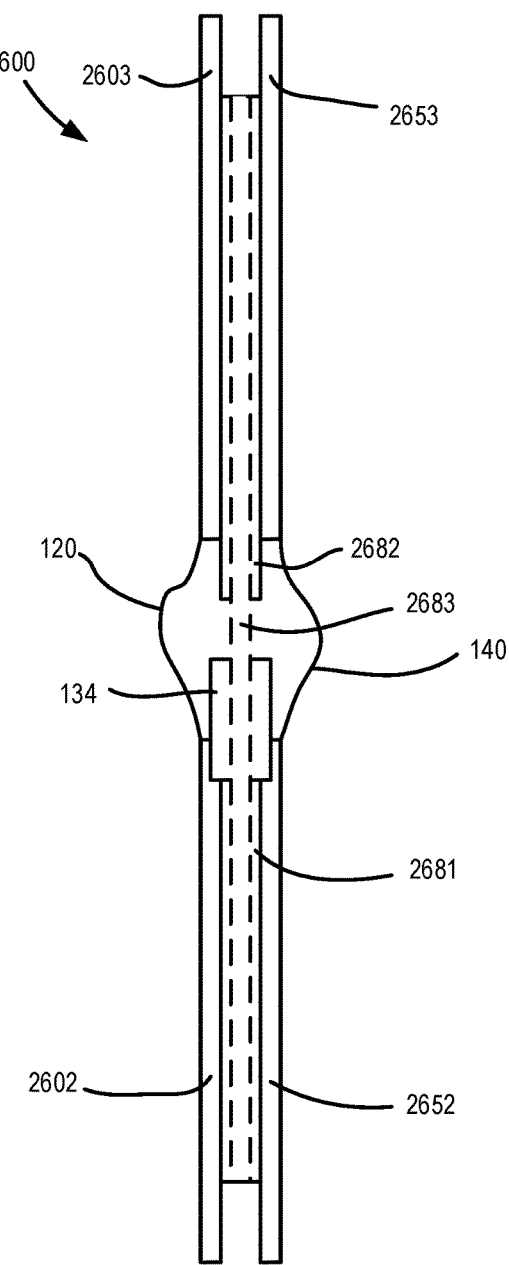
FIG. 27 is a cross-sectional view of a brace component of an adjustable head and neck system in a disengaged configuration in accordance with at least one embodiment.

FIG. 27 is a cross-sectional view of a brace component of an adjustable head and neck system in a disengaged configuration in accordance with at least one embodiment. Brace component 2600 is shown in FIG. 27 in a disengaged configuration, unlike the engaged configuration of FIG. 26. Upper brace stay 2682 is shown as having been removed from a receptacle in brace stay coupler 134, which is shown as fixedly attached to lower brace stay 2681. As can be seen, the elastic cord disposed in lumen 2683 is stretched, allowing easy re-engagement of upper brace stay 2682 with brace stay coupler 134 if desired. However, brace hinge straps 120 and 140 provide the flexibility to allow upper brace stay 2682 to be rotated about a pivot point formed by the elastic cord between upper brace stay 2682 and brace stay coupler 134. Once so rotated such that upper brace stay 2682 is substantially out of alignment with brace stay coupler 134, upper brace stay 2682 and lower brace stay 2681 can be stored in a compact configuration, for example, folded against each other without the tension of the elastic cord inadvertently re-engaging upper brace stay 2682 into the receptacle of brace stay coupler 134.

In accordance with at least one embodiment, the upright brace of the adjustable head and neck system can be incorporated into seats, such as an airplane seat, a car seat, a child seat, or another type of seat. In accordance with at least one embodiment, the anchor pad and upright brace can be constructed as a single, unitized piece. In accordance with at least one embodiment, a rigid locking piece can be provided to unify multiple components, such as an upper brace panel and a lower brace panel, into a rigid assembly providing the strength and stability to hold the head and neck erect.

In accordance with at least one embodiment, an adjustable head and neck system comprises a locking upright brace and a forehead support, the forehead support coupled to the locking upright brace. In accordance with at least one embodiment, the locking upright brace comprises an upper brace panel and a lower brace panel. In accordance with at least one embodiment, the upper brace panel is foldably coupled to the lower brace panel. In accordance with at least one embodiment, the upper brace panel is extensibly coupled to the lower brace panel. In accordance with at least one embodiment, the upper brace panel is foldably and extensibly coupled to the lower brace panel. In accordance with at least one embodiment, the upper brace panel is coupled to the lower brace panel using a rigid coupler to couple rigid stays secured to the upper brace panel and to the lower brace panel. In accordance with at least one embodiment, the rigid stays define lumens through which an elastic cord is disposed, the elastic cord separably connecting the rigid stays together. In accordance with at least one embodiment, the adjustable head and neck system further comprises a neck support, the neck support coupled to the locking upright brace. In accordance with at least one embodiment, the forehead support is selected from a group consisting of a head band, an eye mask, and a cap. In accordance with at least one embodiment, the adjustable head and neck system further comprises a thoracto-abdominal strap coupled to the locking upright brace. In accordance with at least one embodiment, the adjustable head and neck system further comprises an anchor pad, the anchor pad flexibly coupled to the upright brace, the anchor pad configured to anchor the upright brace in relation to a user's back. In accordance with at least one embodiment, the adjustable head and neck system further comprises a thoracto-abdominal strap coupled to the anchor pad. In accordance with at least one embodiment, the adjustable head and neck system is foldable inside-out to form a lumbar vertebral support device.

In accordance with at least one embodiment, an adjustable head and neck system comprises a locking upright brace, a forehead support, the forehead support coupled to the locking upright brace, and an anchor pad, the anchor pad flexibly coupled to the upright brace at a lower extent of the upright brace. In accordance with at least one embodiment, the locking upright brace comprises a plurality of brace portions, the brace portions configurable to a rigid configuration and to a compact configuration. In accordance with at least one embodiment, the compact configuration is a folded configuration. In accordance with at least one embodiment, the adjustable head and neck system further comprises a neck support, the neck support coupled to the locking upright brace.

In accordance with at least one embodiment, an adjustable head and neck system comprises a locking upright brace, a forehead support, the forehead support coupled to the locking upright brace, and a neck support, the neck support coupled to the locking upright brace. In accordance with at least one embodiment, the locking upright brace comprises a plurality of brace portions, the brace portions configurable to a rigid configuration and to a compact configuration. In accordance with at least one embodiment, the adjustable head and neck system further comprises an anchor pad, the anchor pad coupled to the upright locking brace, wherein the anchor pad and at least two of the plurality of brace portions are foldable to form an exterior of the adjustable head and neck system in the compact configuration. In accordance with at least one embodiment, the locking upright brace is coupled to a garment to incorporate into the garment the adjustable head and neck system.

The concepts of the present disclosure have been described above with reference to specific embodiments. However, one of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. An adjustable head and neck system comprises:
   a garment;
   a locking upright brace, wherein the locking upright brace is coupled to the garment; and
   a forehead support, the forehead support coupled to the locking upright brace, wherein the forehead support is selected from a group consisting of a headband, an eye mask, a cap, and a video display eyewear, wherein the locking upright brace comprises an upper brace panel, a lower brace panel, and a pillow, the pillow configured to be a neck support situated at an upper end of the lower brace panel and at a lower end of the upper brace panel in an extended position, the upper brace panel being retractable within the garment, wherein the forehead support is connected to the upper brace panel.

2. The adjustable head and neck system of claim 1 wherein the upper brace panel is foldably coupled to the lower brace panel.

3. The adjustable head and neck system of claim 1 wherein the upper brace panel is extensibly coupled to the lower brace panel.

4. The adjustable head and neck system of claim 1 wherein the upper brace panel is foldably and extensibly coupled to the lower brace panel.

5. The adjustable head and neck system of claim 1 further comprising:
   a thoracto-abdominal strap coupled to the locking upright brace.

6. The adjustable head and neck system of claim 1 further comprising:
   an anchor pad, the anchor pad flexibly coupled to the upright brace, the anchor pad configured to anchor the upright brace in relation to a user's back.

7. An adjustable head and neck system comprises:
   a garment;
   a locking upright brace; wherein the locking upright brace is coupled to the garment;
   a forehead support, the forehead support coupled to the locking upright brace, wherein the forehead support is selected from a group consisting of a headband, an eye mask, a cap, and a video display eyewear; and
   an anchor pad, the anchor pad flexibly coupled to the upright brace at a lower extent of the upright brace, wherein the locking upright brace comprises an upper brace panel, a lower brace panel, and a pillow, the pillow configured to be a neck support situated at an upper end of the lower brace panel and at a lower end of the upper brace panel in an extended position, the upper brace panel being retractable within the garment, wherein the forehead support is connected to the upper brace panel.

8. The adjustable head and neck system of claim 7 wherein the brace portions are configurable to a rigid configuration and to a compact configuration.

9. The adjustable head and neck system of claim 8 wherein the compact configuration is a folded configuration.

10. An adjustable head and neck system comprises:
    a garment;
    a locking upright brace, wherein the locking upright brace is coupled to the garment;
    a forehead support, the forehead support coupled to the locking upright brace, wherein the forehead support is selected from a group consisting of a headband, an eye mask, a cap, and a video display eyewear; and a neck support, the neck support is a pillow coupled to the locking upright brace, wherein the locking upright brace comprises an upper brace panel and a lower brace panel, wherein the pillow is situated at an upper end of the lower brace panel and at a lower end of the upper brace panel in an extended position, the upper brace panel being retractable within the garment, wherein the forehead support is connected to the upper brace panel.

11. The adjustable head and neck system of claim 10 wherein the brace portions are configurable to a rigid configuration and to a compact configuration.

12. The adjustable head and neck system of claim 1 wherein the garment is a hooded garment.

13. The adjustable head and neck system of claim 1 wherein the garment is a backpack.

14. The adjustable head and neck system of claim 7 wherein the garment is a hooded garment.

15. The adjustable head and neck system of claim 7 wherein the garment is a backpack.

16. The adjustable head and neck system of claim 10 wherein the garment is a hooded garment.

17. The adjustable head and neck system of claim 10 wherein the garment is a backpack.

18. The adjustable head and neck system of claim 1 wherein the pillow is connected to the lower brace panel.

19. The adjustable head and neck system of claim 7 wherein the pillow is connected to the lower brace panel.

20. The adjustable head and neck system of claim 10 wherein the pillow is connected to the lower brace panel.

\* \* \* \* \*